United States Patent
Araki et al.

(10) Patent No.: US 9,395,644 B2
(45) Date of Patent: Jul. 19, 2016

(54) IMAGE FORMING APPARATUS AND IMAGE PROCESSING APPARATUS THAT SPECIFY PIXELS TO BE SUBJECTED TO CORRECTION, AND CORRECT EXPOSURE AMOUNT

(71) Applicant: CANON KABUSHIKI KAISHA, Tokyo (JP)

(72) Inventors: Go Araki, Suntou-gun (JP); Hidenori Kanazawa, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/885,071

(22) Filed: Oct. 16, 2015

(65) Prior Publication Data

US 2016/0124336 A1     May 5, 2016

(30) Foreign Application Priority Data

Oct. 31, 2014 (JP) ................................. 2014-223193
Oct. 31, 2014 (JP) ................................. 2014-223194
Sep. 7, 2015 (JP) ................................. 2015-175890

(51) Int. Cl.
*G03G 15/04* (2006.01)
*G03G 15/043* (2006.01)

(52) U.S. Cl.
CPC .................................. *G03G 15/043* (2013.01)

(58) Field of Classification Search
CPC ............ G03G 15/043; G03G 15/0435; G03G 15/326; G03G 2215/0404; G03G 15/011; H04N 2201/0471; H04N 2201/04794
See application file for complete search history.

(56) References Cited

U.S. PATENT DOCUMENTS

| | | |
|---|---|---|
| 5,450,208 A | 9/1995 | Murata |
| 6,975,428 B1 | 12/2005 | Ernst et al. |
| 8,208,172 B2 | 6/2012 | Takayama et al. |
| 8,441,683 B2 | 5/2013 | Matsuya |
| 9,019,518 B2 | 4/2015 | Takayama et al. |
| 2003/0210409 A1 | 11/2003 | Huang et al. |
| 2008/0094465 A1* | 4/2008 | Okutsu .................... B41J 2/442 347/248 |
| 2008/0158606 A1* | 7/2008 | Matsuzaki ............. G06K 15/02 358/1.18 |

(Continued)

FOREIGN PATENT DOCUMENTS

| | | |
|---|---|---|
| JP | 9-18726 A | 1/1997 |
| JP | 9-85993 A | 3/1997 |

(Continued)

OTHER PUBLICATIONS

EP Communication and Search Report mailed May 20, 2016, issued in counterpart European Patent Application No. 15188892.2.

*Primary Examiner* — Francis Gray
(74) *Attorney, Agent, or Firm* — Fitzpatrick, Cella, Harper & Scinto

(57) ABSTRACT

An image forming apparatus includes: specifying unit configured to specify, based on image data, a pixel to be subjected to correction from among pixels of an image to be formed from the image data; and a correction unit configured to correct an exposure amount of an exposure unit for the pixel to be subjected to correction from an exposure amount indicated by the image data. The correction unit is further configured to correct the exposure amount applied by the exposure unit to the pixel to be subjected to correction by not exposing at least a portion of a region of the pixel to be subjected to correction according to the distance between the pixel to be subjected to correction and an edge of the image to be formed from the image data.

31 Claims, 26 Drawing Sheets

(56) References Cited

U.S. PATENT DOCUMENTS

| | | |
|---|---|---|
| 2009/0185227 A1 | 7/2009 | Matsuya |
| 2013/0208068 A1* | 8/2013 | Furuta .............. G03G 15/04054 347/118 |
| 2013/0308166 A1 | 11/2013 | Uchidate et al. |
| 2014/0210954 A1* | 7/2014 | Takahashi ......... H01L 27/14621 348/49 |
| 2015/0205222 A1* | 7/2015 | Araki ................... G03G 15/043 399/53 |

FOREIGN PATENT DOCUMENTS

| | | |
|---|---|---|
| JP | 10-229493 A | 8/1998 |
| JP | 2000-343748 A | 12/2000 |
| JP | 2003-345076 A | 12/2003 |
| JP | 2004-299239 A | 10/2004 |
| JP | 2007-006392 A | 1/2007 |
| JP | 2007-272153 A | 10/2007 |
| JP | 2009-171439 | 7/2009 |
| JP | 2013-011740 | 1/2013 |
| JP | 2014-165776 A | 9/2014 |

* cited by examiner

FIG. 7A  FIG. 7B  FIG. 7C
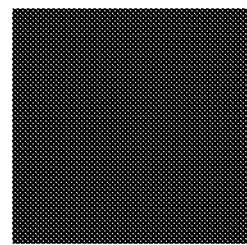
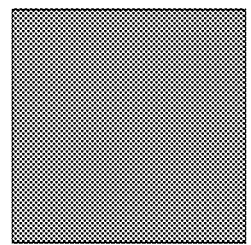
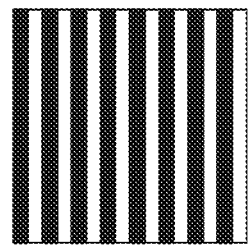
FIG. 8
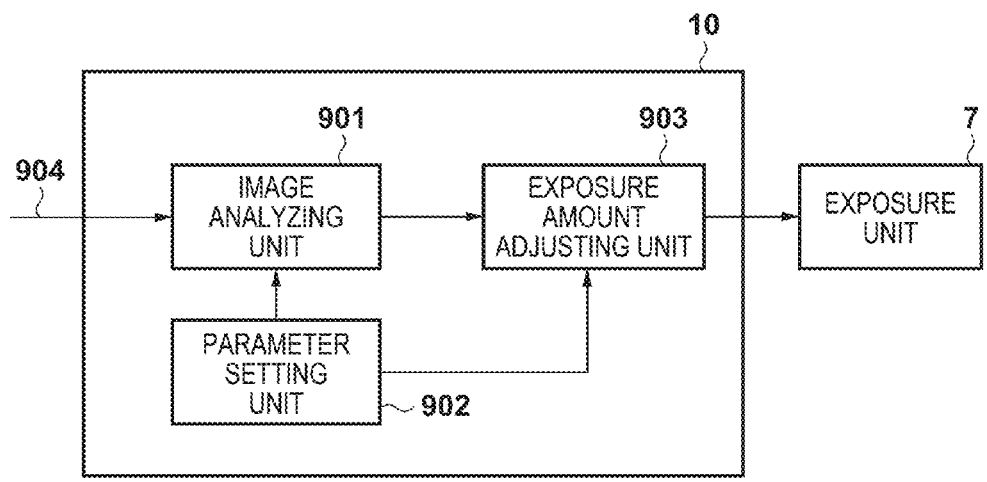

FIG. 10A

| 255 | 255 | 255 | 255 | 255 | 255 | 255 | 255 | 255 | 255 | 255 | 255 | 255 | 255 | 255 | 255 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |

FIG. 10B

| 255 | 255 | 255 | 255 | 255 | 255 | 255 | 255 | 255 | 255 | 255 | 255 | 255 | 255 | 255 | 255 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |

FIG. 10C

| 255 | 255 | 255 | 255 | 255 | 255 | 255 | 255 | 255 | 255 | 255 | 255 |
|---|---|---|---|---|---|---|---|---|---|---|---|
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |

FIG. 11A

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 2 | 2 | 2 | 2 | 2 | 2 | 2 | 2 | 2 | 2 | 2 | 2 | 2 | 2 | 1 |
| 1 | 2 | 3 | 3 | 3 | 3 | 3 | 3 | 3 | 3 | 3 | 3 | 3 | 3 | 2 | 1 |
| 1 | 2 | 3 | 4 | 4 | 4 | 4 | 4 | 4 | 4 | 4 | 4 | 4 | 3 | 2 | 1 |
| 1 | 2 | 3 | 4 | 5 | 5 | 5 | 5 | 5 | 5 | 5 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |
| 1 | 2 | 3 | 4 | 5 | 5 | 5 | 5 | 5 | 5 | 5 | 5 | 4 | 3 | 2 | 1 |
| 1 | 2 | 3 | 4 | 4 | 4 | 4 | 4 | 4 | 4 | 4 | 4 | 4 | 3 | 2 | 1 |
| 1 | 2 | 3 | 3 | 3 | 3 | 3 | 3 | 3 | 3 | 3 | 3 | 3 | 3 | 2 | 1 |
| 1 | 2 | 2 | 2 | 2 | 2 | 2 | 2 | 2 | 2 | 2 | 2 | 2 | 2 | 2 | 1 |
| 1 | 1 | 1 | 1 | 1 | 1 | 1 | 1 | 1 | 1 | 1 | 1 | 1 | 1 | 1 | 1 |

FIG. 11B

| 1 | 2 | 3 | 4 | 5 | 0 | 0 | 0 | 0 | 0 | 0 | 5 | 4 | 3 | 2 | 1 |
|---|---|---|---|---|---|---|---|---|---|---|---|---|---|---|---|
| 1 | 2 | 3 | 4 | 5 | 0 | 0 | 0 | 0 | 0 | 0 | 5 | 4 | 3 | 2 | 1 |
| 1 | 2 | 3 | 4 | 5 | 0 | 0 | 0 | 0 | 0 | 0 | 5 | 4 | 3 | 2 | 1 |

FIG. 11C

| 1 | 1 | 1 | 1 | 1 | 1 | 1 | 1 | 1 | 1 | 1 | 1 |
|---|---|---|---|---|---|---|---|---|---|---|---|
| 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 |
| 3 | 3 | 3 | 3 | 3 | 3 | 3 | 3 | 3 | 3 | 3 | 3 |
| 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 |

FIG. 13A

| DISTANCE FROM EDGE | PROPORTION OF REDUCTION IN HEIGHT | PROPORTION OF REDUCTION IN EXPOSURE AMOUNT | |
|---|---|---|---|
| | | EXPOSURE INTENSITY | PWM |
| 1 | -0.13 | -0.13 | 0 |
| 2 | 1.25 | 0.25 | 0.25 |
| 3 | 1.5 | 0.5 | 0.5 |
| 4 | 1.25 | 0.25 | 0.25 |
| 5 | 1.125 | 0.125 | 0.125 |

FIG. 13B

| DISTANCE FROM EDGE | PROPORTION OF REDUCTION IN HEIGHT | PROPORTION OF REDUCTION IN EXPOSURE AMOUNT | |
|---|---|---|---|
| | | EXPOSURE INTENSITY | PWM |
| 1 | -0.13 | -0.13 | 0 |
| 2 | 1.25 | 0.25 | 0.25 |
| 3 | 1.5 | 0.5 | 0.5 |

FIG. 16A

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 5 | 5 | 5 | 5 | 5 | 5 | 5 | 5 | 5 | 5 | 5 | 5 | 5 | 5 | 5 | 5 |
| 4 | 4 | 4 | 4 | 4 | 4 | 4 | 4 | 4 | 4 | 4 | 4 | 4 | 4 | 4 | 4 |
| 3 | 3 | 3 | 3 | 3 | 3 | 3 | 3 | 3 | 3 | 3 | 3 | 3 | 3 | 3 | 3 |
| 2 | 2 | 2 | 2 | 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 | 1 | 1 | 1 | 1 |

FIG. 16B

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 16C

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 5 | 5 | 5 | 5 | 5 | 5 | 5 | 5 | 5 | 5 | 5 | 5 | 5 | 5 | 5 | 5 |
| 4 | 4 | 4 | 4 | 4 | 4 | 4 | 4 | 4 | 4 | 4 | 4 | 4 | 4 | 4 | 4 |
| 3 | 3 | 3 | 3 | 3 | 3 | 3 | 3 | 3 | 3 | 3 | 3 | 3 | 3 | 3 | 3 |
| 2 | 2 | 2 | 2 | 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 | 1 | 1 | 1 | 1 |

FIG. 17A

| 1 | 1 | 1 | 1 | 1 | 1 | 1 | 1 |

FIG. 17B

| 1 | 1 | 1 | 1 | 1 | 1 | 1 | 1 |
| 2 | 2 | 2 | 2 | 2 | 2 | 2 | 2 |
| 1 | 1 | 1 | 1 | 1 | 1 | 1 | 1 |

FIG. 17C

| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5 | 5 | 5 | 5 | 5 | 5 | 5 | 5 |
| 0 | 0 | 0 | 0 | 0 | 0 | 0 | 0 |
| 5 | 5 | 5 | 5 | 5 | 5 | 5 | 5 |
| 4 | 4 | 4 | 4 | 4 | 4 | 4 | 4 |
| 3 | 3 | 3 | 3 | 3 | 3 | 3 | 3 |
| 2 | 2 | 2 | 2 | 2 | 2 | 2 | 2 |
| 1 | 1 | 1 | 1 | 1 | 1 | 1 | 1 |

F I G. 18

| DISTANCE FROM EDGE | PROPORTION OF REDUCTION IN HEIGHT | PROPORTION OF REDUCTION IN EXPOSURE AMOUNT | |
|---|---|---|---|
| | | EXPOSURE INTENSITY | PWM |
| 1 | -0.13 | - | - |
| 2 | 1.25 | - | - |
| 3 | 1.5 | 0.5 | 0.5 |
| 4 | 1.25 | 0.25 | 0.25 |
| 5 | 1.125 | 0.125 | 0.125 |

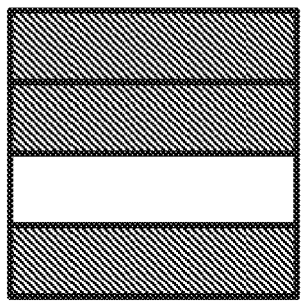
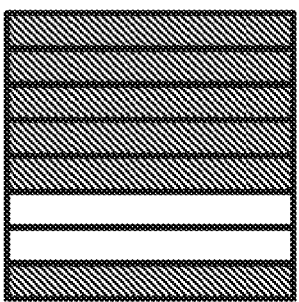
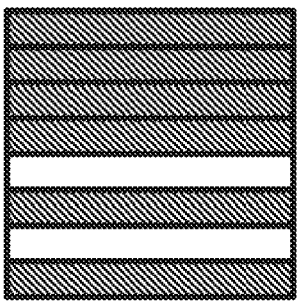
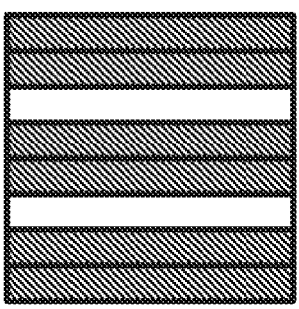
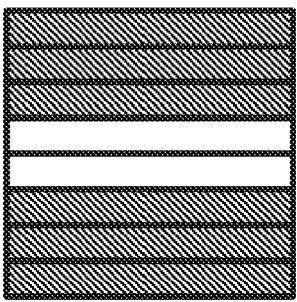
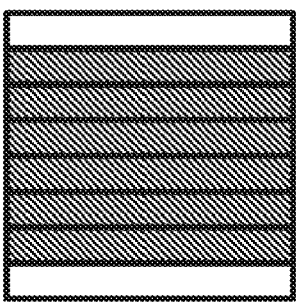
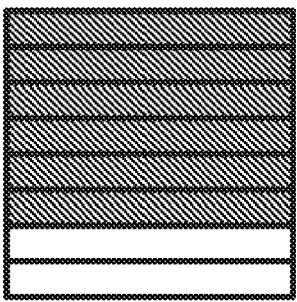
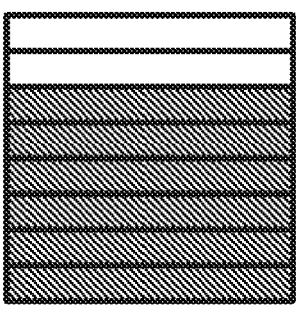

FIG. 22A

| | CONDITION 1 | CONDITION 2 | CONDITION 3 | CONDITION 4 |
|---|---|---|---|---|
| CORRECTION WIDTH PARAMETER | 6 PIXELS | 5 PIXELS | 4 PIXELS | 3 PIXELS |
| EXPOSURE AMOUNT ADJUSTMENT PARAMETER | 50% | 40% | 30% | 25% |

FIG. 22B

| | CONDITION 1 | CONDITION 2 | CONDITION 3 | CONDITION 4 |
|---|---|---|---|---|
| CORRECTION WIDTH PARAMETER | 5 PIXELS | 5 PIXELS | 3 PIXELS | — |
| EXPOSURE AMOUNT ADJUSTMENT PARAMETER | 50% | 40% | 30% | — |

FIG. 22C

| | CONDITION 1 | CONDITION 2 | CONDITION 3 | CONDITION 4 |
|---|---|---|---|---|
| CORRECTION WIDTH PARAMETER | 7 PIXELS | 7 PIXELS | 6 PIXELS | 6 PIXELS |
| EXPOSURE AMOUNT ADJUSTMENT PARAMETER | 60% | 60% | 40% | 30% |

~604

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 255 | 255 | 255 | 255 | 255 | 255 | 255 | 0 | 0 |
| 0 | 255 | 255 | 255 | 255 | 255 | 255 | 255 | 0 | 0 |
| 0 | 255 | 255 | 255 | 255 | 255 | 255 | 255 | 0 | 0 |
| 0 | 255 | 255 | 255 | 255 | 255 | 255 | 255 | 0 | 0 |
| 0 | 255 | 255 | 255 | 255 | 255 | 255 | 255 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 1 | 1 | 1 | 1 | 1 | 1 | 1 | 0 | 0 |
| 0 | 1 | 1 | 1 | 1 | 1 | 1 | 1 | 0 | 0 |
| 0 | 1 | 1 | 0 | 0 | 0 | 1 | 1 | 0 | 0 |
| 0 | 1 | 1 | 1 | 1 | 1 | 1 | 1 | 0 | 0 |
| 0 | 1 | 1 | 1 | 1 | 1 | 1 | 1 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

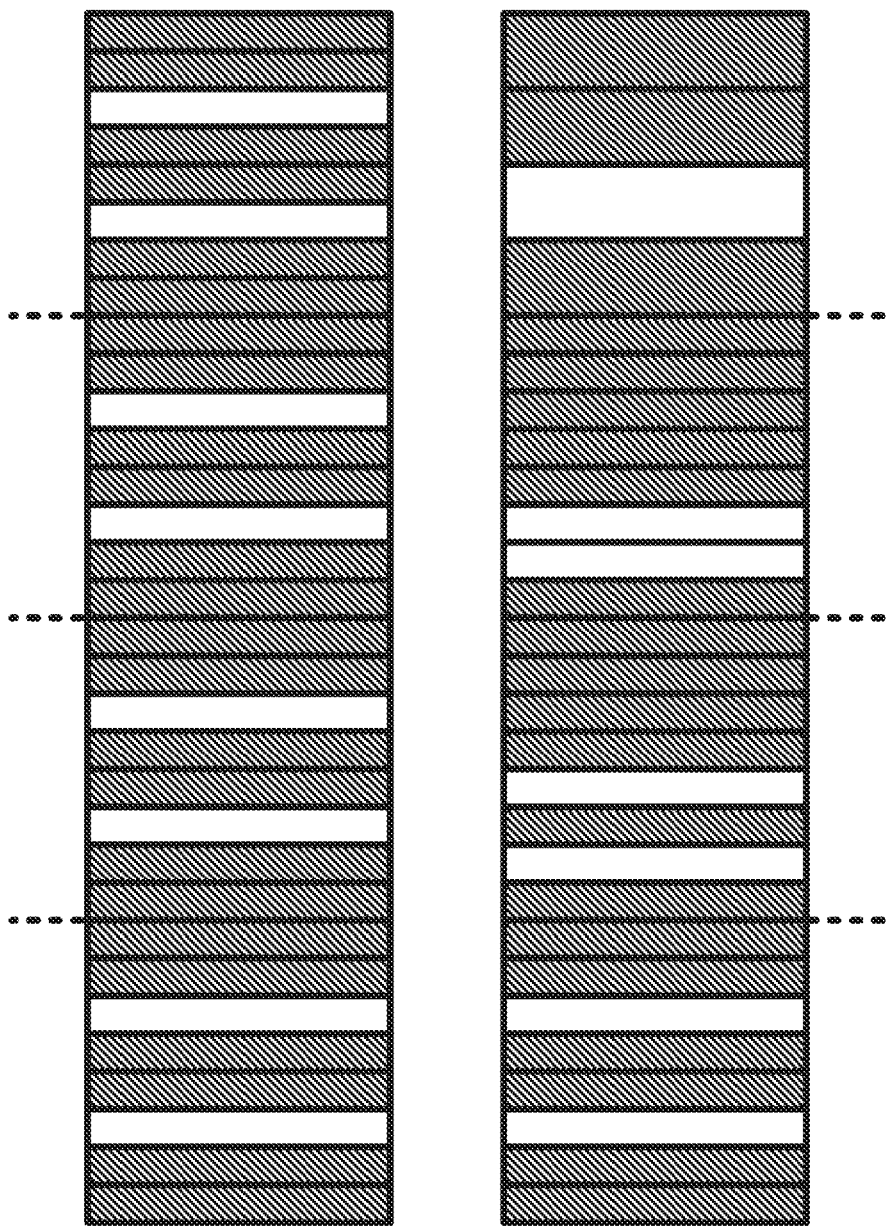

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 1 | 1 | 1 | 1 | 1 | 1 | 1 | 0 | 0 |
| 0 | 1 | 1 | 1 | 1 | 1 | 1 | 1 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

IMAGE FORMING APPARATUS AND IMAGE PROCESSING APPARATUS THAT SPECIFY PIXELS TO BE SUBJECTED TO CORRECTION, AND CORRECT EXPOSURE AMOUNT

BACKGROUND OF THE INVENTION

1. Field of the Invention

The present invention relates to an image forming apparatus and an image processing apparatus that are capable of reducing the amount of developer consumed.

2. Description of the Related Art

Regarding image forming apparatuses, there is a demand for reducing the consumption amount of toner, which is developer. Japanese Patent Laid-Open No. 2004-299239 discloses a configuration for reducing the consumption amount of toner by lowering the exposure intensity with respect to images having a relatively large area. Also, in image forming apparatuses, the phenomenon called "sweeping" may occur, in which an increased amount of toner adheres to the trailing edge of an electrostatic latent image formed on a photosensitive member in the rotational direction of the photosensitive member. Japanese Patent Laid-Open No. 2007-272153 discloses a configuration for suppressing the influence of sweeping. Specifically, a correction region is determined according to the data value of a pixel and the data value of the pixel that is located downstream of the aforementioned pixel by a predetermined amount in the sub-scanning direction. Furthermore, according to the disclosed configuration, a pixel that is located upstream of the correction region pixel by a predetermined amount in the sub-scanning direction is also determined to be in a correction region, and the influence of sweeping is suppressed by adjusting the exposure amount applied to these correction region pixels. Suppressing the influence of sweeping, results in a reduction in the consumption amount of toner.

Also, Japanese Patent Laid-Open No. 2003-345076 discloses a configuration for reducing the exposure time, using pulse width modulation in order to suppress degradation in image quality due to sweeping. Furthermore, Japanese Patent Laid-Open No. 2000-343748 discloses a configuration for adjusting the exposure amount in order to suppress degradation in image quality due to the edge effect.

However, with the configurations according to the documents described above, there is the possibility of degradation in dot reproducibility and the possibility of degradation in image quality of narrow line-shaped images, which result from adjustments made to the exposure amount.

In recent years, regarding image forming apparatuses, there has been an increasing demand for reducing the amount of developer consumed while suppressing degradation in image quality. Also, regarding image forming apparatuses, there is also a demand for suppressing undesired radiation noise (radiated electromagnetic waves).

SUMMARY OF THE INVENTION

According to an aspect of the present invention, an image forming apparatus that forms an image based on image data, includes: a photosensitive member; an exposure unit configured to form an electrostatic latent image by exposing the photosensitive member; a developing unit configured to form an image by developing the electrostatic latent image on the photosensitive member with developer; a specifying unit configured to specify, based on image data, a pixel to be subjected to correction from among pixels of an image to be formed from the image data; and a correction unit configured to correct an exposure amount applied by the exposure unit for the pixel to be subjected to correction from an exposure amount indicated by the image data. The correction unit is further configured to correct the exposure amount applied by the exposure unit to the pixel to be subjected to correction by not exposing at least a portion of a region of the pixel to be subjected to correction according to the distance between the pixel to be subjected to correction and an edge of the image to be formed from the image data.

Further features of the present invention will become apparent from the following description of exemplary embodiments with reference to the attached drawings.

BRIEF DESCRIPTION OF THE DRAWINGS

FIGS. 7A, 7B, and 7C are diagrams illustrating a method for controlling the exposure amount according to an embodiment.

FIG. 8 is a functional block diagram of a CPU for controlling the exposure amount according to an embodiment.

FIGS. 10A, 10B, and 10C are diagrams showing pixel values of images according to an embodiment.

FIGS. 11A, 11B, and 11C are diagrams showing pixels to be subjected to correction in images according to an embodiment.

FIGS. 13A and 13B are diagrams showing exposure amount adjustment parameters according to an embodiment.

FIGS. 16A, 16B, and 16C are diagrams showing pixels to be subjected to correction in an image according to an embodiment.

FIGS. 17A, 17B, and 17C are diagrams showing pixels to be subjected to correction in an image according to an embodiment.

FIG. 18 is a diagram showing exposure amount adjustment parameters according to an embodiment.

FIGS. 20A to 20H are diagrams illustrating a method for controlling an exposure amount according to an embodiment.

FIGS. 22A to 22C are diagrams showing parameters according to an embodiment.

FIGS. 24A and 24B are diagrams illustrating a pixel exposure method according to an embodiment.

DESCRIPTION OF THE EMBODIMENTS

The following disclosure describes exemplary embodiments of the present invention with reference to the drawings. Note that the embodiments described below are merely examples, and the present invention is not limited to the embodiments. Also, note that constituent elements that are unnecessary for describing the embodiments are omitted from the drawings.

First Embodiment

Figure 1:
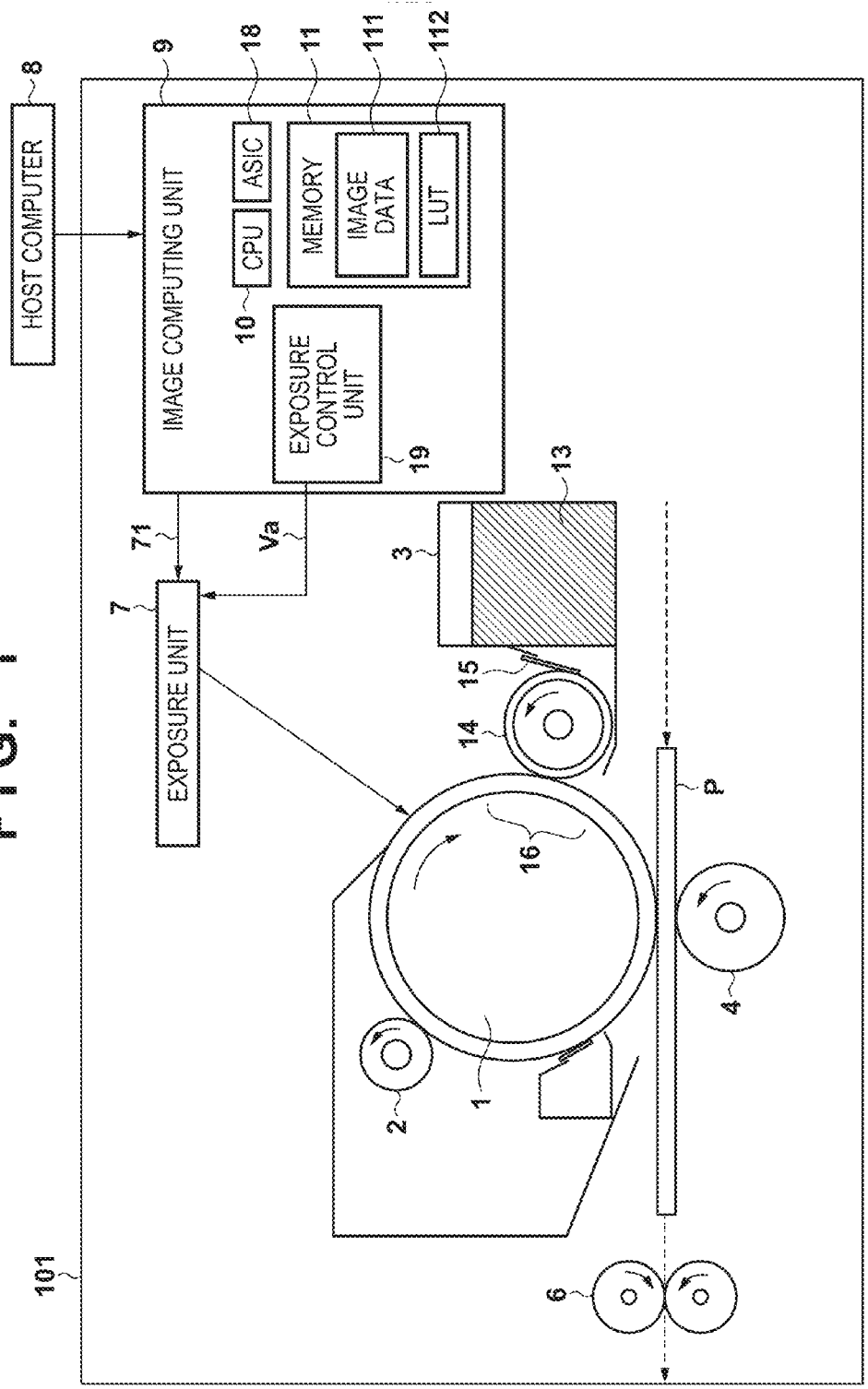
FIG. 1 is a configuration diagram of an image forming apparatus according to an embodiment.

FIG. 1 is a configuration diagram of an image forming apparatus 101 according to the present embodiment. During image formation, a photosensitive member 1, which is an image carrier, is driven to rotate in the direction indicated by the arrow shown in the drawing. A charging unit 2 charges the surface of the photosensitive member 1 to a uniform potential. An exposure unit 7 forms an electrostatic latent image on the photosensitive member 1 by exposing the charged surface of the photosensitive member 1 to light that is based on image data. Note that the exposure unit 7 is driven by a driving signal 71 that is output by an image computing unit 9. An exposure control unit 19 of the image computing unit 9 makes an adjustment such that the intensity of exposure to light performed by the exposure unit 7 with a voltage Va reaches a target value.

A developing unit 3 includes a container 13 for storing toner, which is developer, and a developing roller 14. Toner may be non-magnetic single-component toner, two-component toner, or magnetic toner. A regulation blade 15 is provided in order to regulate the layer thickness of the toner supplied to the developing roller 14 such that the thickness is a predetermined value. The regulation blade 15 may also be configured to cause toner to have electric charges. Toner is conveyed to a developing region 16 by the developing roller 14. Note that the developing region 16 is a region in which the developing roller 14 and the photosensitive member 1 come close to or come in contact with each other, and in which the attachment of toner to the electrostatic latent image is executed. The developing unit 3 attaches the toner to the electrostatic latent image formed on the photosensitive member 1, and thus the electrostatic latent image is visualized as a toner image. A transfer unit 4 transfers the toner image formed on the photosensitive member 1 to a recording material P. A fixing unit 6 applies heat and pressure to the recording material P, thereby fixing the toner image, which has been transferred to the recording material P, to the recording material P.

A CPU 10 of the image computing unit 9 serves as a control unit for executing overall control of the image forming apparatus 101. Note that not only a configuration in which all sorts of control described below are executed by the CPU 10, but also a configuration in which some of them are executed by an ASIC 18 may be adopted. Also, a configuration may be adopted in which all sorts of control described below are executed by the ASIC 18. A memory 11 is a storage unit, and stores image data and holds LUTs 112. The LUTs 112 are lookup tables, and contain correction width parameters and exposure amount adjustment parameters, which are described below. The image computing unit 9 receives image data, which is transmitted from a host computer 8, and makes corrections to the image data according to the correction width parameters and the exposure amount adjustment parameters held by the LUTs 112 such that the edge effect and the influence of sweeping are suppressed and the consumption amount of toner is reduced.

Figure 2A:
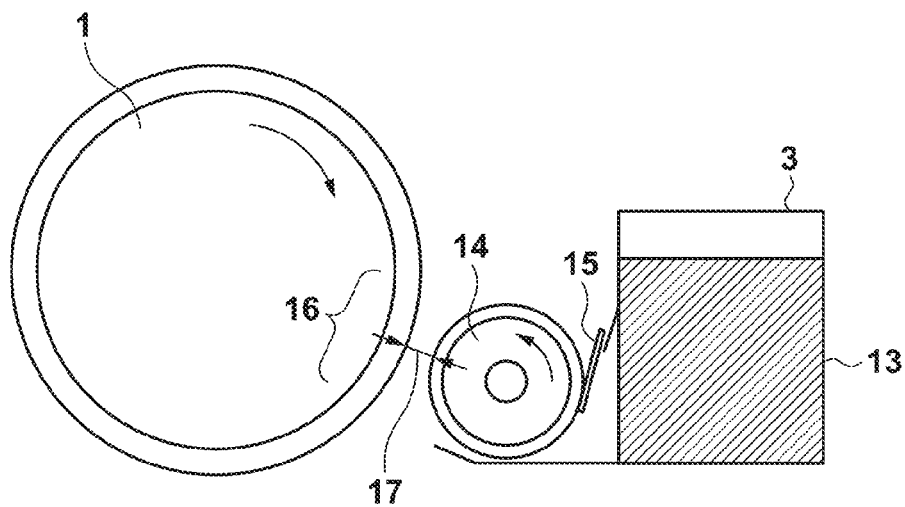
FIGS. 2A and 2B are diagrams illustrating developing methods according to an embodiment.
Figure 2B:
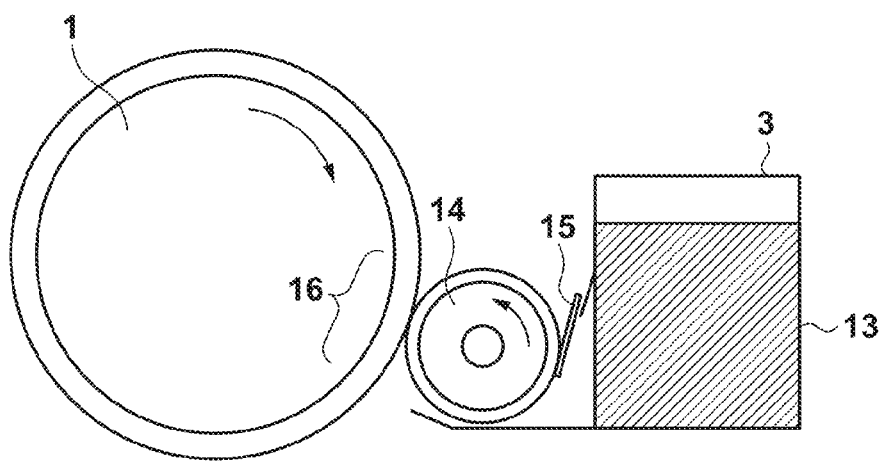

Next, with reference to FIG. 2A and FIG. 2B, a description is provided of developing methods employed by the developing unit 3. FIG. 2A shows a configuration for a jumping developing method. When the jumping developing method is adopted, the developing roller 14 and the photosensitive member 1 are not brought into contact with each other, and a gap 17 of a predetermined distance is provided between them. An alternating current bias on which a direct current bias is superimposed is used as the developing bias output by the developing roller 14. FIG. 2B shows a configuration for a contact developing method. When the contact developing method is adopted, the developing roller 14 and the photosensitive member 1 are brought into contact with each other. A direct current bias is used as the developing bias output by the developing roller 14. When the contact developing method is adopted, the photosensitive member 1 and the developing roller 14 may be configured to, for example, rotate in opposite directions from each other as shown in FIG. 2B, i.e., their respective surfaces within the developing region 16 move in the same direction.

Figure 3:
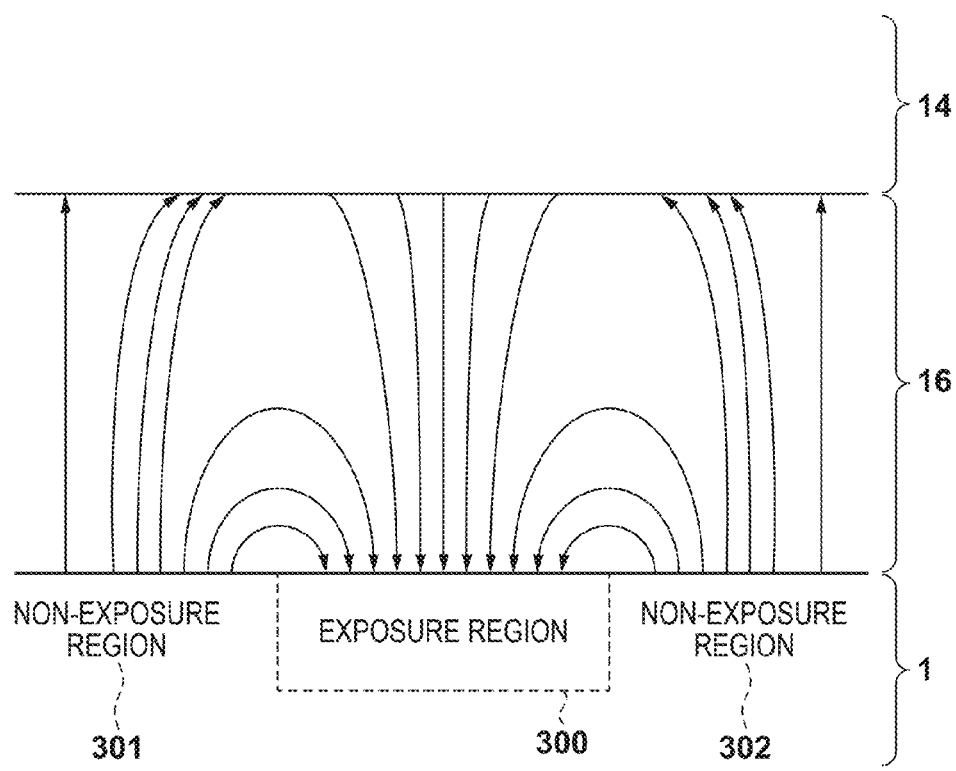
FIG. 3 is a diagram illustrating a mechanism by which the edge effect occurs.

Next, a description is provided of a mechanism by which the edge effect occurs, which increases the amount of toner adhering to the electrostatic latent image at the edge portion, and a description is also given of a mechanism by which sweeping occurs. The edge effect refers to the phenomenon in which the electrical field is concentrated at the boundary between the electrostatic latent image formed on the photosensitive member 1, or in other words an exposure region, and a non-exposure region other than the exposure region, and an excessive amount of toner adheres to each edge of the electrostatic latent image. For example, it is assumed that the image to be formed has a uniform density. As shown in FIG. 3, lines of electric force from non-exposure regions 301 and 302, which surround an exposure region 300, turn around and reach the edges of the exposure region 300, and accordingly the electrical field strength at the edges becomes greater than that in other regions in the exposure region 300. Therefore, a greater amount of toner adheres to the edges of the exposure region 300 than to other regions.

Figure 4A:
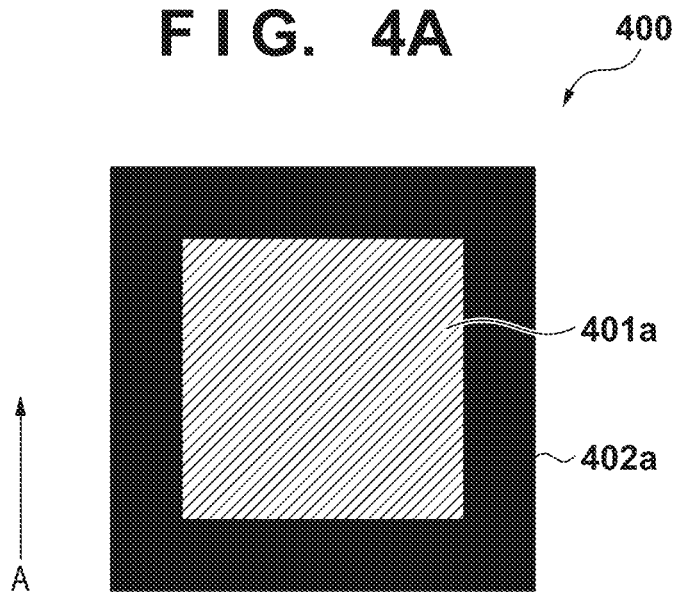
FIGS. 4A and 4B show images in which the edge effect and sweeping occurred.

FIG. 4A shows a toner image 400 in which the edge effect occurred. An arrow A shown in FIG. 4A indicates the conveyance direction of the toner image, i.e., the rotational direction of the photosensitive member 1. The image data from which the toner image 400 is formed, has the same value for all pixels, i.e., the toner image 400 is an image having a uniform density. If the edge effect occurs, toner concentrates and adheres to the entirety of an edge region 402a of the toner image 400. As a result, the density in the edge region 402a is greater than the density in a non-edge region 401a. Note that the edge effect mainly occurs in the case of the jumping developing method, according to which a gap is provided between the photosensitive member 1 and the developing roller 14.

Figure 5A:
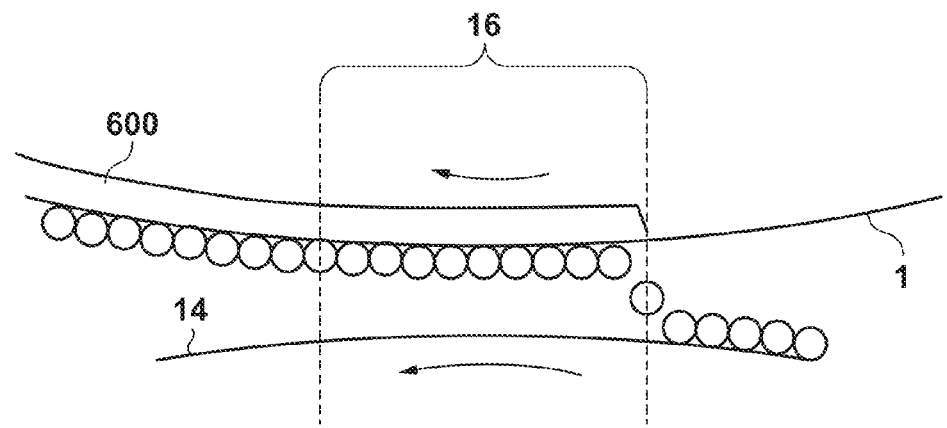
FIGS. 5A, 5B, and 5C are diagrams illustrating a mechanism by which sweeping occurs.
Figure 5B:
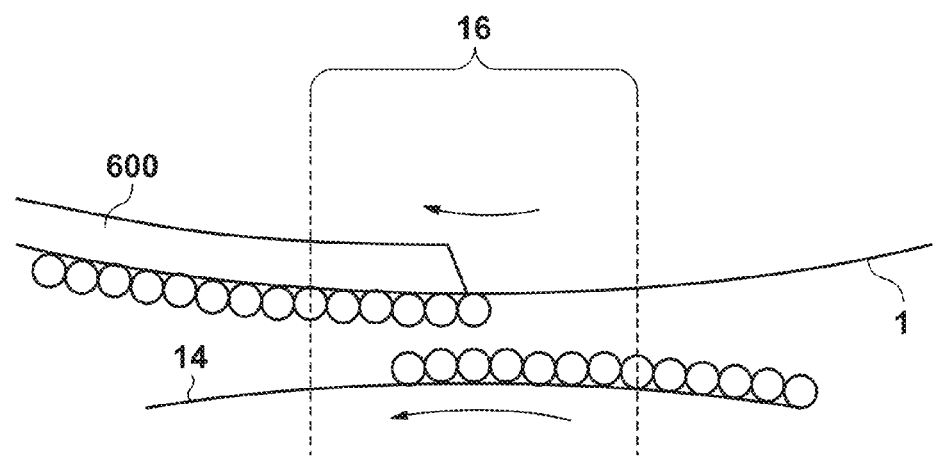
Figure 5C:
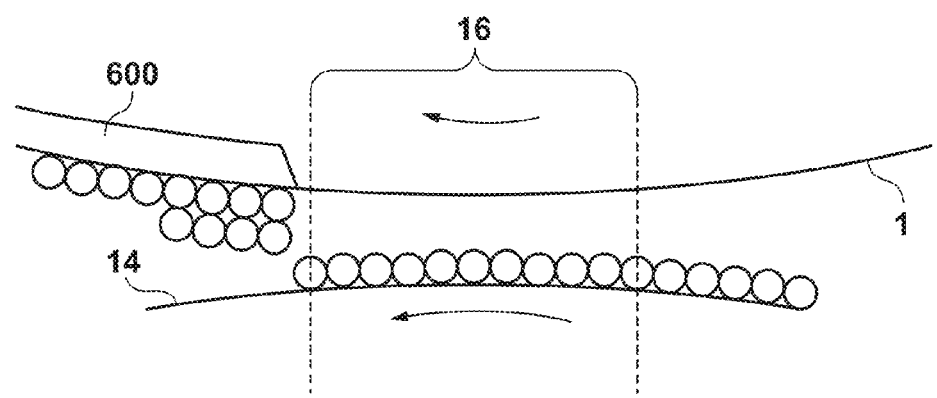

On the other hand, sweeping is the phenomenon in which toner concentrates at the trailing edge of the toner image in the rotational direction of the photosensitive member 1. According to the contact developing method, the circumferential speed of the developing roller 14 is set to be higher than the circumferential speed of the photosensitive member 1 in order to set the thickness of the toner on the photosensitive member 1 to a predetermined value. As shown in FIG. 5A to FIG. 5C, within the developing region 16, an electrostatic latent image is developed with toner conveyed thereto by the developing roller 14. Note that in FIG. 5A to FIG. 5C, toner is depicted as circles. Since the developing roller 14 is rotating at a higher speed than the photosensitive member 1, the positional relationship on their surfaces change constantly. As shown in FIG. 5A, at the time when the trailing edge of an electrostatic latent image 600 enters the developing region 16, the toner on the developing roller 14 is located behind the starting position of the developing region 16 in the rotational direction. However, since the rotation speed of the developing roller 14 is higher than the rotation speed of the photosensitive member 1, as shown in FIG. 5B, the toner on the developing roller 14 moves ahead of the trailing edge of the electrostatic latent image 600 before the trailing edge of the electrostatic latent image 600 exits the developing region 16. Then, as shown in FIG. 5C, the toner on the developing roller 14 is supplied to the trailing edge of the electrostatic latent image 600, and accordingly the amount of toner adhering to the trailing edge of the electrostatic latent image increases. This is the mechanism by which sweeping occurs.

Figure 4B:
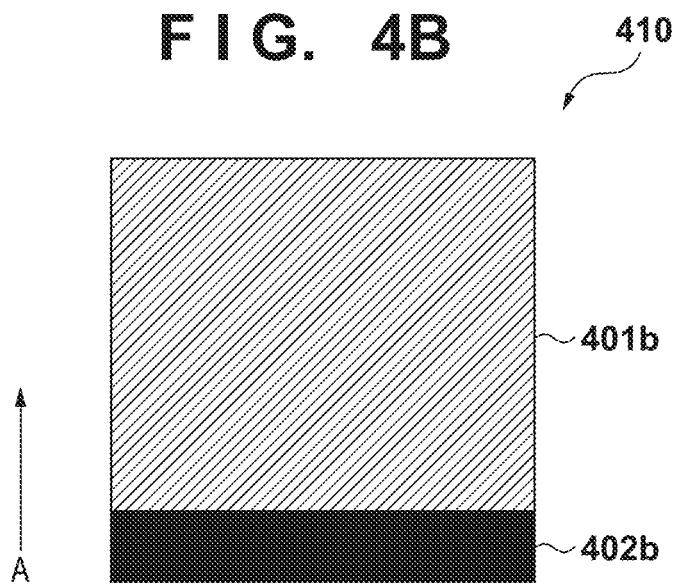

FIG. 4B shows a toner image 410 in which sweeping occurred. An arrow A shown in FIG. 4B indicates the direction in which the toner image is conveyed, i.e., the rotational direction of the photosensitive member 1. The image data based on which the toner image 410 is formed has the same value for all pixels, i.e., the toner image 410 is an image having a uniform density. When sweeping occurs, toner concentrates at and adheres to a trailing edge region 402b of the toner image 410. As a result, the density in the trailing edge region 402b is higher than the density in the other region, namely a region 401b.

Figure 6:
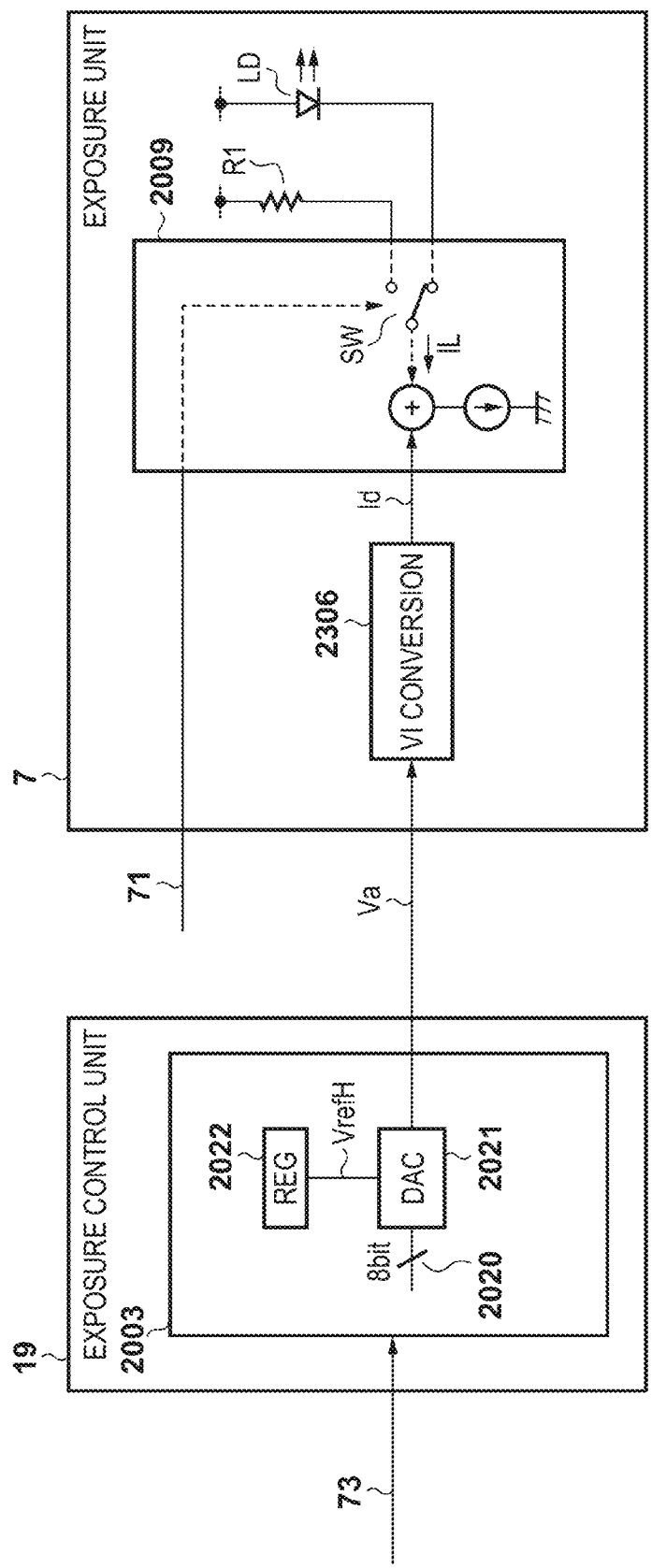
FIG. 6 is a diagram showing a configuration for controlling an exposure amount according to an embodiment.

FIG. 6 shows a configuration for controlling the exposure unit 7. The exposure control unit 19 has an IC 2003, which includes an 8-bit DA converter (DAC) 2021 and a regulator (REG) 2022. The IC 2003 adjusts a voltage VrefH, which is output from the regulator 2022, based on an intensity adjustment signal 73, which has been set by the CPU 10. The voltage VrefH serves as a reference voltage for the DA converter 2021. The IC 2003 sets input data 2020 for the DA converter 2021, and accordingly, the DA converter 2021 outputs a voltage Va to the exposure unit 7. A VI conversion circuit 2306 of the exposure unit 7 converts the voltage Va to a current value Id, and outputs it to a driver IC 2009. The driver IC 2009 controls the intensity of exposure by the exposure unit 7 according to the current value Id. In other words, the exposure control unit 19 can control the intensity of exposure by the exposure unit 7 according to the voltage Va. Also, the driver IC 2009 operates a switch (SW) of the driver IC 2009 in response to the driving signal 71 output by the image computing unit 9. The SW switches the path of a current IL between the path to a laser diode (LD) of the exposure unit 7 and the path to a dummy resistor R1, thereby performing ON/OFF control for light emission from the LD.

Next, a description is provided of a method for controlling the exposure amount for pixels. FIG. 7A shows a state in which the entire region of one pixel is subjected to exposure with 100% intensity relative to a predetermined target intensity. FIG. 7B and FIG. 7C each show a pixel with substantially half the density of the pixel shown in FIG. 7A. The pixel shown in FIG. 7B is formed by exposing the entire region of the one pixel with 50% intensity relative to the target intensity. Note that, as described above using FIG. 6, the exposure intensity is controlled with the voltage Va, which is output by the exposure control unit 19 to the exposure unit 7. FIG. 7C shows a case in which one pixel is divided into N subpixels (N is a natural number greater than or equal to 2), where the pixel is formed by exposing every other subpixel with 100% intensity relative to the target intensity. This is realized by, in the control configuration shown in FIG. 6, setting the voltage Va such that the exposure intensity equals the target intensity, and turning ON/OFF the SW with the driving signal 71. In this case, the driving signal 71 is a PWM (pulse width modulation) signal.

FIG. 8 shows a functional block of the CPU 10, which is configured to suppress the edge effect. Note that, in the present embodiment, it is the CPU 10 that performs processing for suppressing the edge effect. However, as already described, a configuration in which the CPU 10 performs this processing in cooperation with the ASIC 18, and a configuration in which only the ASIC 18 performs this processing, are also acceptable. A parameter setting unit 902 provides information about, or sets, the correction width parameter in the LUTs 112 and transmits that data to an image analyzing unit 901. Also, the parameter setting unit 902 provides information about, or sets, the exposure amount adjustment parameters in the LUTs 112 to an exposure amount adjusting unit 903. Image data 904, which is transmitted from the host computer 8, is stored in the memory 11 shown in FIG. 1. Based on the correction width parameter, the image analyzing unit 901 specifies, from among the pixels of the image to be formed from the image data 904, pixels in which the edge effect may occur, and informs the exposure amount adjusting unit 903 of the specified pixels. Based on the exposure amount adjustment parameters, the exposure amount adjusting unit 903 corrects the respective pixel values of the pixels specified by the image analyzing unit 901, thereby generating corrected image data. The exposure unit 7 is controlled with this corrected image data. Note that the correction width parameter is information that indicates the range of the pixels in which the edge effect may occur, and the range is represented as the distance from an edge, particularly by the number of pixels from an edge in this example. For example, when the correction width parameter is "5", it is determined that the edge effect may occur in 5 rows of pixels from an edge. Note that in the present embodiment, if the number of pixels of the width in a given direction is smaller than the value of the correction width parameter, the operation to specify the pixels to be subjected to correction is not performed with respect to the direction. The correction width parameter and the exposure amount adjustment parameters are obtained in advance by experiments, simulations, etc. As illustrated in FIG. 7B and FIG. 7C, methods for adjusting the exposure amount for pixels include the method in which the exposure intensity is adjusted and the method in which the number of subpixels to be subjected to exposure is changed according to the PWM signal instead of changing the exposure intensity. Note that it is also possible to change the exposure intensity and then change the number of subpixels to be subjected to exposure according to the PWM signal.

Figure 9A:
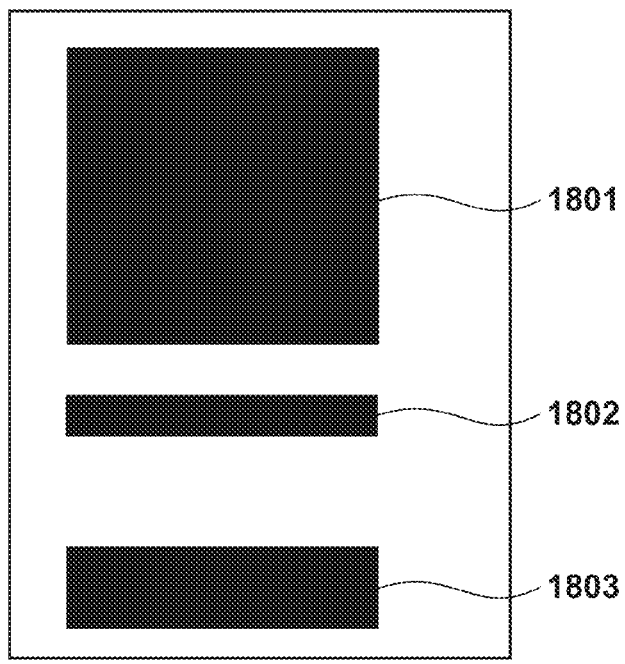
FIGS. 9A and 9B are diagrams illustrating images according to an embodiment.

Next, a description is provided of processing performed by the image analyzing unit 901. In the following, it is assumed that the correction width parameter is "5". FIG. 9A shows an image formed with the image data 904. The image includes three image regions in which toner is used, namely image regions 1801, 1802, and 1803. FIGS. 10A and 10B respectively show the pixel values of the image region 1801 and the pixel values of the image region 1802. FIG. 10C particularly shows a middle portion of the image region 1803 in the direction that is orthogonal to the direction in which the toner image is conveyed (indicated by an arrow A in the drawing). Note that the pixel value "255" indicates the color black. FIGS. 11A to 11C each show the pixels specified by the image analyzing unit 901 as the pixels in which the edge effect may occur, in other words the pixels to be subjected to exposure amount correction. Note that the value "0" in FIGS. 11A to 11C indicates a pixel that is not to be subjected to correction, and values other than "0" indicate pixels to be subjected to correction. The value of a pixel to be subjected to correction indicates the distance from an edge. According to the present embodiment, the amount of the correction made to the exposure amount is changed, depending on the distance from an edge.

As shown in FIG. 10B and FIG. 11B, the width of the image region 1802 in the rotational direction of the photosensitive member 1 is 3 pixels, which is smaller than the correction width parameter. In this case, regarding the image region 1802, pixels arranged along the rotational direction from the edge in the rotational direction are not subjected to the determination as to whether or not they are to be subjected to correction. However, since the width of the image region 1802 in the direction that is orthogonal to the rotational direction of the photosensitive member 1 is 16 pixels, a determination as to whether or not pixels are to be subjected to correction is made with respect to this orthogonal direction. Therefore, regarding the image region 1802, as shown in FIG. 11B, 5 pixels from each edge in the direction that is orthogonal to the rotational direction are the pixels to be subjected to correction. Also, as shown in FIG. 10A and FIG. 11A, regarding pixels for which a plurality of edges are present within the range indicated by the correction width parameter, the correction is made based on the distance from the closest edge.

Figure 12A:
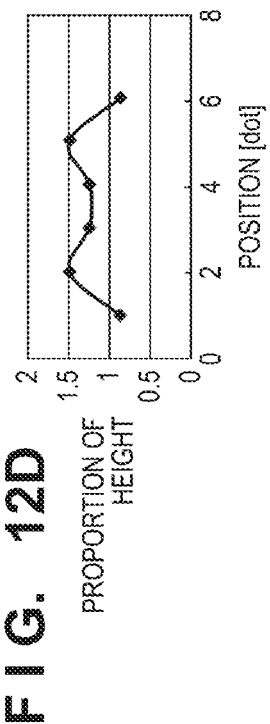
FIGS. 12A to 12F are diagrams illustrating a correction made to address the edge effect according to an embodiment.
Figure 12B:
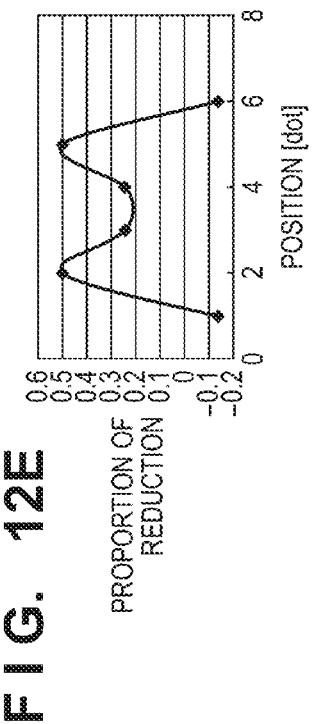
Figure 12C:
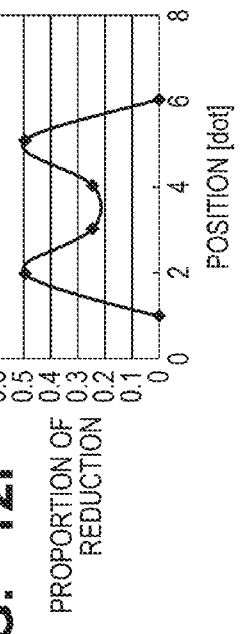
Figure 14A:
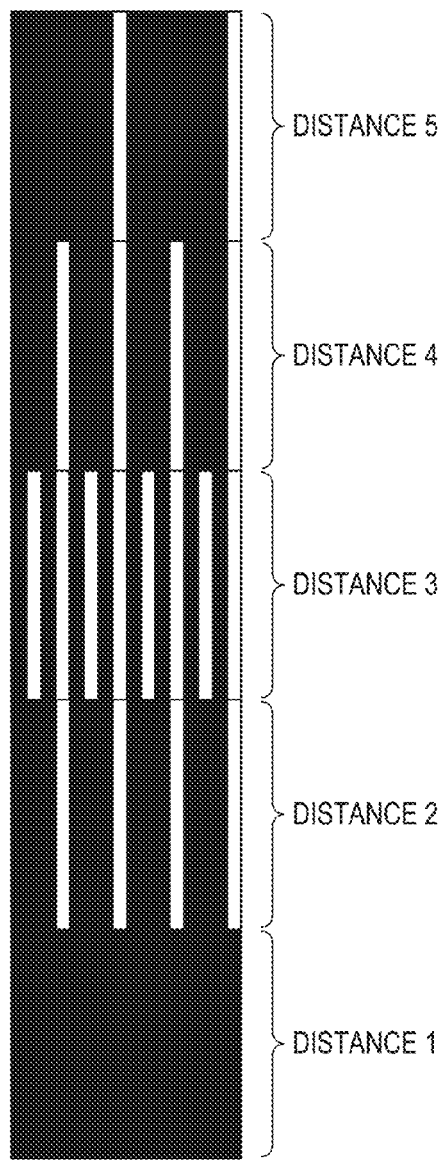
FIGS. 14A and 14B are diagrams illustrating a pixel exposure method according to an embodiment.

Next, a description is given of exposure amount correction. FIG. 12A shows the height of toner in a view of a given cross section of the image region 1801 in which the edge effect occurred. Note that normalization is performed relative to the height of toner on pixels in which no edge effect occurred, which is considered to be 1. As shown in FIG. 12A, the height of toner on pixels in edge portions of the cross section is smaller than 1. FIG. 12B shows the proportion of the reduction in the height of toner in the case where the height of toner on all of the pixels is to be set to 1. In contrast, FIG. 12C shows the proportion of the reduction in the case where no correction is made to the height of toner on pixels in edge portions of the cross section. In FIG. 12C, with respect to the pixels to be subjected to correction, the exposure amount therefor is unchanged or reduced. FIG. 13A shows the exposure amount adjustment parameters corresponding to FIG. 12B and FIG. 12C. As shown in FIG. 13A, the exposure amount adjustment parameters are information indicating the amount of a correction made to the exposure amount in order to adjust the height of toner, i.e., the amount of correction made to the pixel value. Note that the exposure intensity shown in FIG. 13A corresponds to the method by which the exposure amount is adjusted according to the exposure intensity as described for FIG. 7B, and the PWM corresponds to the method by which the exposure amount is adjusted according to the PWM as described for FIG. 7C. FIG. 14A shows, with respect to pixels whose pixel value is "255", their subpixels that are to be subjected to exposure in the case of adjusting the exposure amount according to the PWM, where the subpixels are grouped according to their distance from an edge.

Figure 12D:
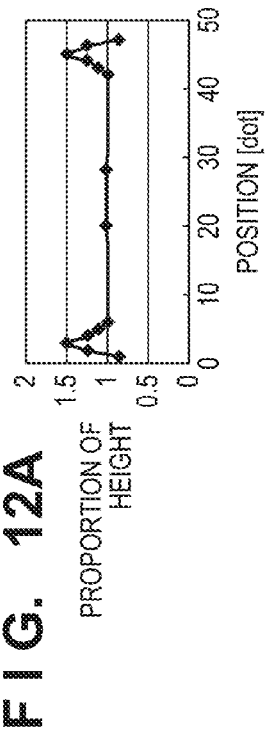
Figure 12E:
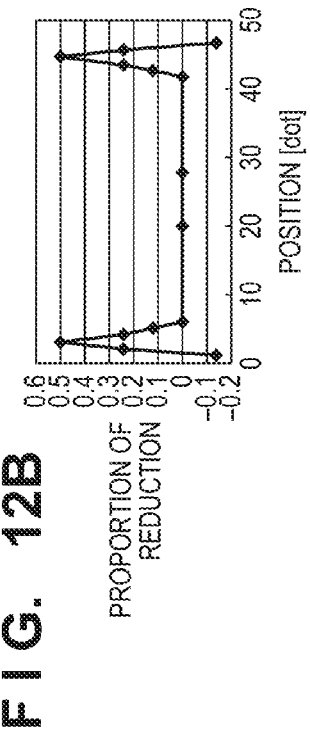
Figure 12F:
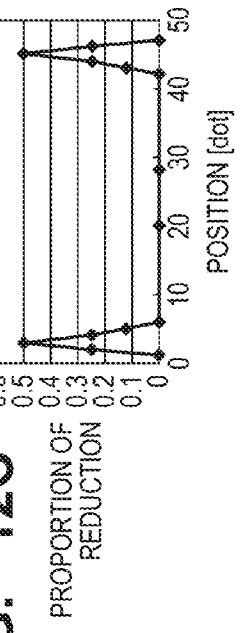

FIG. 12D shows the height of toner in a view of a given cross section of the image region 1803 in which the edge effect occurred. Note that the edge effect occurred in all of the pixels in the image region 1803 as shown in FIG. 11C. Also note that the height of toner on pixels in edge portions of the cross section is smaller than 1. FIG. 12E shows the proportion of the reduction in the height of toner in the case where the height of toner on all of the pixels is to be set to 1. FIG. 12F shows the proportion of the reduction in the case where no correction is made to the height of toner on pixels in edge portions of the cross section. FIG. 13B shows the exposure amount adjustment parameters corresponding to FIG. 12E and FIG. 12F.

The exposure amount adjusting unit 903 corrects the pixel value (exposure amount) of each of the pixels to be subjected to correction according to the exposure amount adjustment parameters shown in FIG. 13A and FIG. 13B. Then, the image computing unit 9 controls the exposure unit 7 based on the corrected pixel values.

Figure 15:
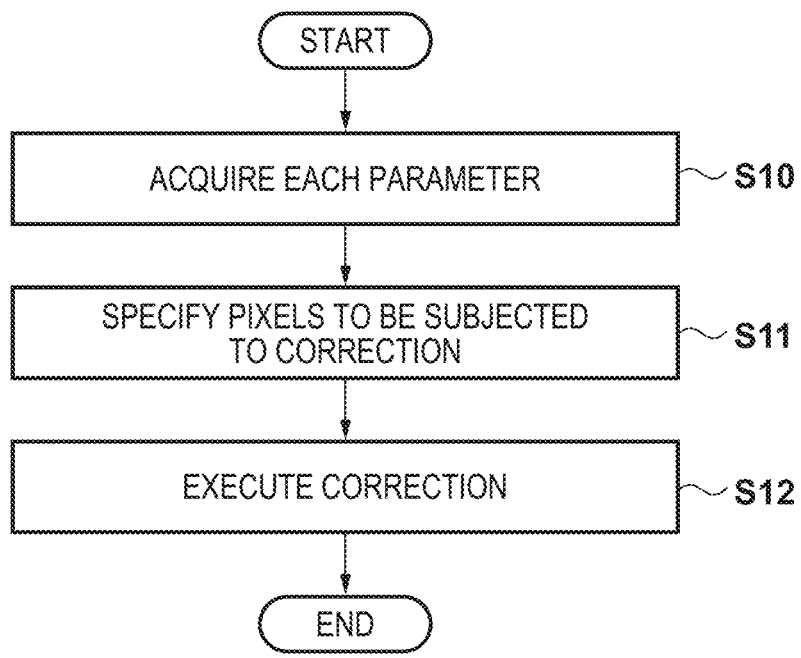
FIG. 15 is a flowchart of correction processing according to an embodiment.

FIG. 15 is a flowchart of exposure amount correction processing executed by the CPU 10. In step S10, the CPU 10 acquires the correction width parameter and the exposure amount adjustment parameter, which are indicated by the LUTs 112. In step S11, the CPU 10 specifies, from image data, the pixels to be subjected to correction based on the correction width parameter. In step S12, the CPU 10 corrects the pixel values of the pixels to be subjected to correction based on the exposure amount adjustment parameters. Note that in the present specification, cases where a pixel value is "corrected" include cases where the pixel value is ultimately not corrected.

Next, a description is provided of the method for suppressing the influence of sweeping. Suppressing sweeping is the same as suppressing the edge effect, except that pixels in which sweeping may occur are a number of rows of pixels starting from the trailing edge of the toner image, the number being indicated by the correction width parameter. FIGS. 16A, 16B, and 16C show the pixels to be subjected to correction in the image regions 1801, 1802, and 1803 of FIG. 9A, respectively. Note that the correction width parameter is "5" in this example as well. As shown in FIG. 16B, in the image region 1802, the number of pixels in the rotational direction of the photosensitive member 1 is smaller than the number indicated by the correction width parameter, and accordingly none of the pixels in the image region 1802 are subjected to correction.

As described above, pixels that may be influenced by the edge effect or sweeping are specified based on the correction width parameter, and are determined to be the pixels to be subjected to correction. Then, with respect to the pixels to be subjected to correction, the exposure amount is corrected according to the distance from an edge. Note that cases where an exposure amount is "corrected" include cases where the exposure amount is ultimately not corrected. With this configuration, it is possible to adjust the exposure amount for pixels to which an excessive amount of toner adheres due to the edge effect or sweeping. Also, since the exposure amount is not unnecessarily reduced, it is possible to suppress degradation in dot reproducibility and degradation in image quality of narrow line-shaped images. In particular, when the width of an image is smaller than the width indicated by the correction width parameter, the determination for specifying the pixels to be subjected to correction is not made with respect to the width direction. As a result, it is possible to further suppress degradation in dot reproducibility and degradation in image quality of narrow line-shaped images. Also, by preventing adhesion of an excessive amount of toner, it is possible to suppress the consumption amount of toner. Note that in the present embodiment, when the width of an image in a given direction is smaller than the value indicated by the correction width parameter, the determination as to whether or not pixels are to be subjected to correction is not made with respect to the direction. However, a configuration may be adopted in which a predetermined value is set in addition to the correction width parameter, and when the width of an image in a given direction is smaller than the predetermined value, the determination as to whether or not pixels are to be subjected to correction is not made with respect to the given direction.

Second Embodiment

In the first embodiment, when the width in a given direction is smaller than the width indicated by the correction width parameter, the processing for a determination as to whether or not pixels are to be subjected to correction is not made with respect to the given direction. In the present embodiment, the determination as to whether or not pixels are to be subjected to correction is made even in such cases. The following describes the present embodiment, focusing mainly on differences from the first embodiment.

Figure 9B:
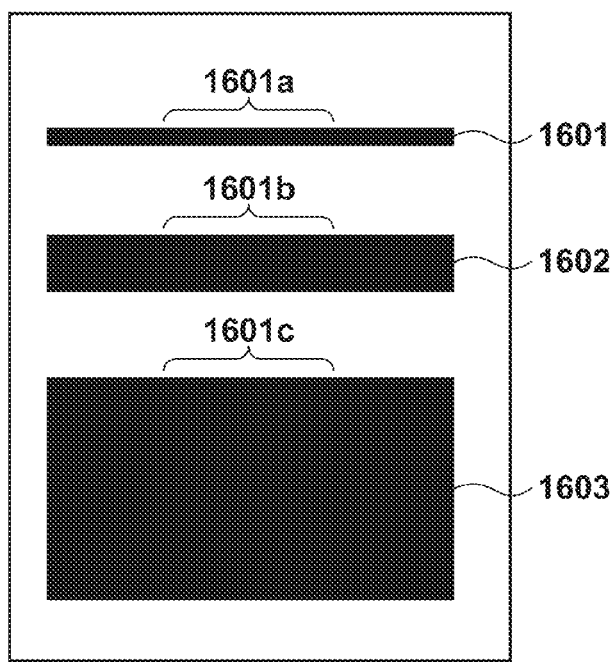

FIG. 9B shows an image formed with the image data 904. The image includes three image regions in which toner is used, namely image regions 1601, 1602, and 1603. In the following, it is assumed that the respective pixel values of the pixels in each image region are all "255". It is also assumed that the correction width parameter is "5". FIGS. 17A to 17C each show the pixels specified by the image analyzing unit 901 as the pixels in which the edge effect may occur, in other words the pixels to be subjected to exposure amount correction. Note that FIG. 17A to 17C particularly show regions 1601a, 1601b, and 1601c of FIG. 9B, respectively. Regarding the region 1601a, the width in the rotational direction of the photosensitive member 1 is 1 pixel, and accordingly, the distance from an edge is 1 for all the pixels. Regarding the region 1601b, the width in the rotational direction of the photosensitive member 1 is 3 pixels, and accordingly, as for the pixels at the ends in the rotational direction, the distance from an edge is 1, and as for the pixels in the middle in the rotational direction, the distance from an edge is 2. Regarding the region 1601c, the distance from each edge in the rotational direction is set.

Figure 14B:
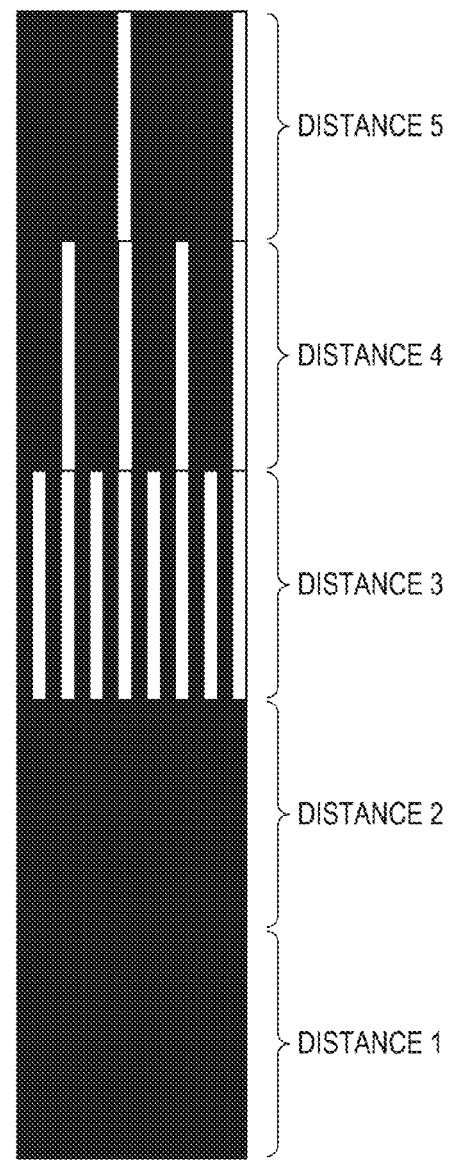

FIG. 18 shows exposure amount adjustment parameters according to the present embodiment. In the present embodiment, unlike in the first embodiment, no correction is made to pixels whose distance from an edge is smaller than or equal to a predetermined value. In this example, it is assumed that the predetermined value is 2. Note that in the present embodiment, it is assumed that pixels to be subjected to correction are those within the range of 5 pixels from an edge, and the exposure amount adjustment parameters are set such that the exposure amount for pixels whose distance from an edge is 1 or 2 will not be adjusted. However, a configuration may be adopted in which "3" and "5" are set to the correction width parameters, and pixels to be subjected to correction are pixels whose distance from an edge is greater than or equal to 3 pixels and smaller than or equal to 5 pixels. In such a configuration, the pixels to be subjected to correction are pixels for which the exposure amount is adjusted. Also, when the PWM is used, pixels to be subjected to correction are pixels for which the exposure amount is reduced. FIG. 14B shows, with respect to pixels whose pixel value is "255", their subpixels that are to be subjected to exposure in the case of adjusting the exposure amount according to the PWM, and the subpixels are grouped according to the distance from an edge.

In the present embodiment, as shown in FIG. 18, pixels whose distance from an edge is smaller than or equal to a predetermined value are not subjected to correction. With this configuration, it is possible to suppress degradation in dot reproducibility and degradation in image quality of narrow line-shaped images.

The embodiments above are each described based on the image forming apparatus 101. However, the present invention can be realized as an image processing apparatus that provides corrected image data to an image forming apparatus. The image processing apparatus includes the image computing unit 9 shown in FIG. 1, and generates corrected image data by adjusting the exposure amount as described above. Then, the image processing apparatus provides the generated image data to the image forming apparatus, not to the exposure unit 7. Then, the exposure unit 7 of the image forming apparatus performs exposure of the photosensitive member 1 with the corrected exposure amount based on the corrected image data.

Third Embodiment

Figure 19:
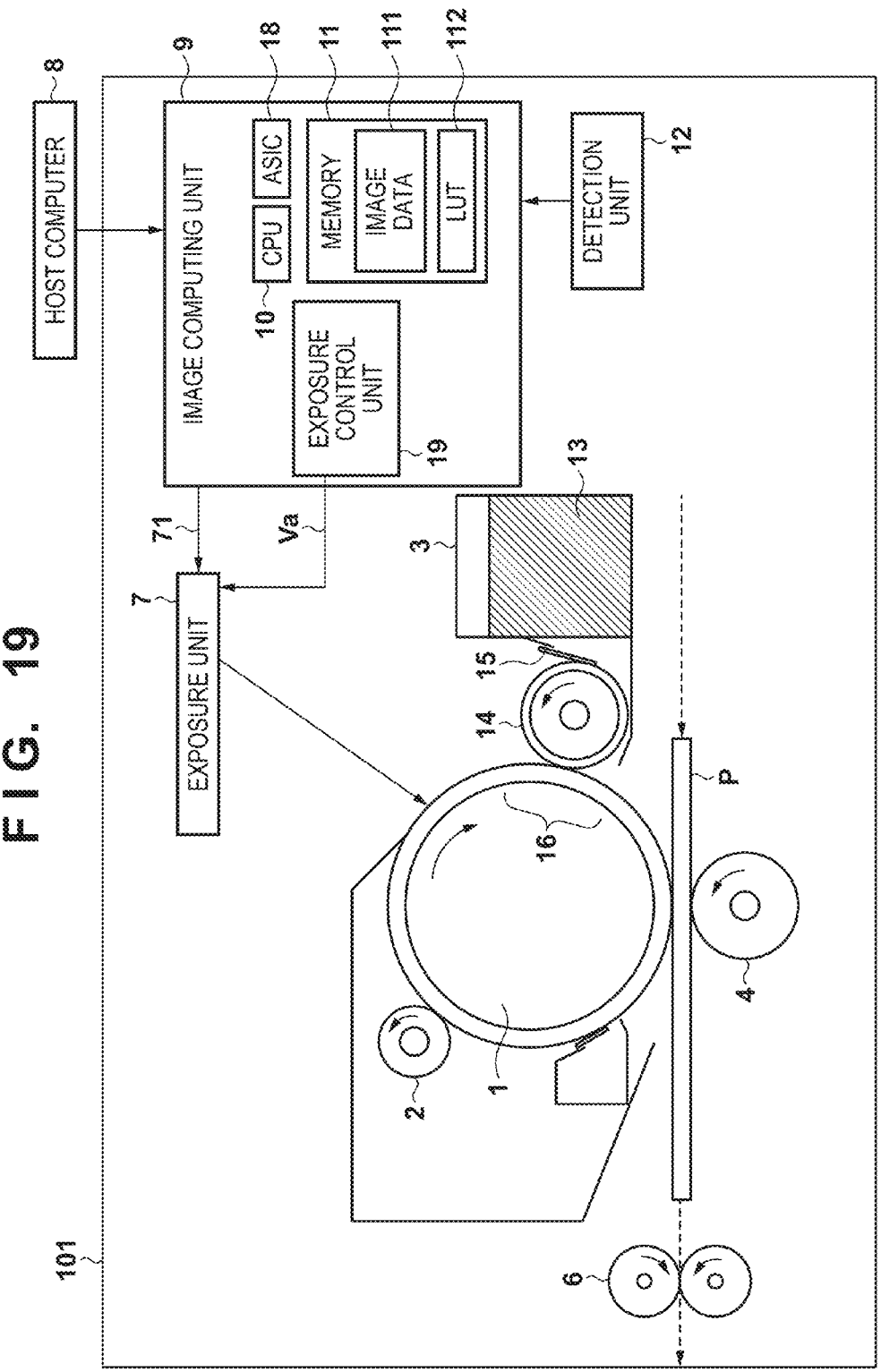
FIG. 19 is a configuration diagram of an image forming apparatus according to an embodiment.

Next, a description is provided of a third embodiment. FIG. 19 is a configuration diagram of an image forming apparatus 101 according to the present embodiment. Note that the same elements as those shown in FIG. 1 are denoted with the same reference numerals and their description is omitted. A detection unit 12 detects status information, which indicates the status of the image forming apparatus 101, and provides it to the CPU 10. The status information includes, for example, ambient information, or usage status information, or both of them. The ambient information is information that indicates the image forming apparatus's environment, such as the ambient temperature and the ambient humidity. The usage status information is information indicating the degree of deterioration of the image forming apparatus 101 due to its use, such as an image formation count, the cumulative operation time of the image forming apparatus 101, and the surface resistance value of the photosensitive member 1.

Next, a description is provided of a method for adjusting the exposure amount for one pixel according to the present embodiment. In the present embodiment, the exposure intensity is kept constant at a predetermined value, each pixel is divided into N subpixels, and the number of subpixels that are to be subjected to exposure with the intensity at the predetermined value and the number of subpixels that are not to be subjected to exposure are changed. Thus, the exposure amount for each pixel is adjusted. FIGS. 20A to 20H each show a pixel for which the exposure amount is 75%. Note that 100% exposure amount is the exposure amount when all of the subpixels of one pixel are subjected to exposure with a predetermined exposure intensity. Also note that N=4 in FIG. 20D and N=8 in the other figures. When subpixels are subjected to exposure, the SW shown in FIG. 6 is turned ON, and when they are not subjected to exposure, the SW shown in FIG. 6 is turned OFF. In other words, in the present embodiment, the driving signal 71 output by the image computing unit 9 to the exposure unit 7 is a PWM signal.

Figure 21:
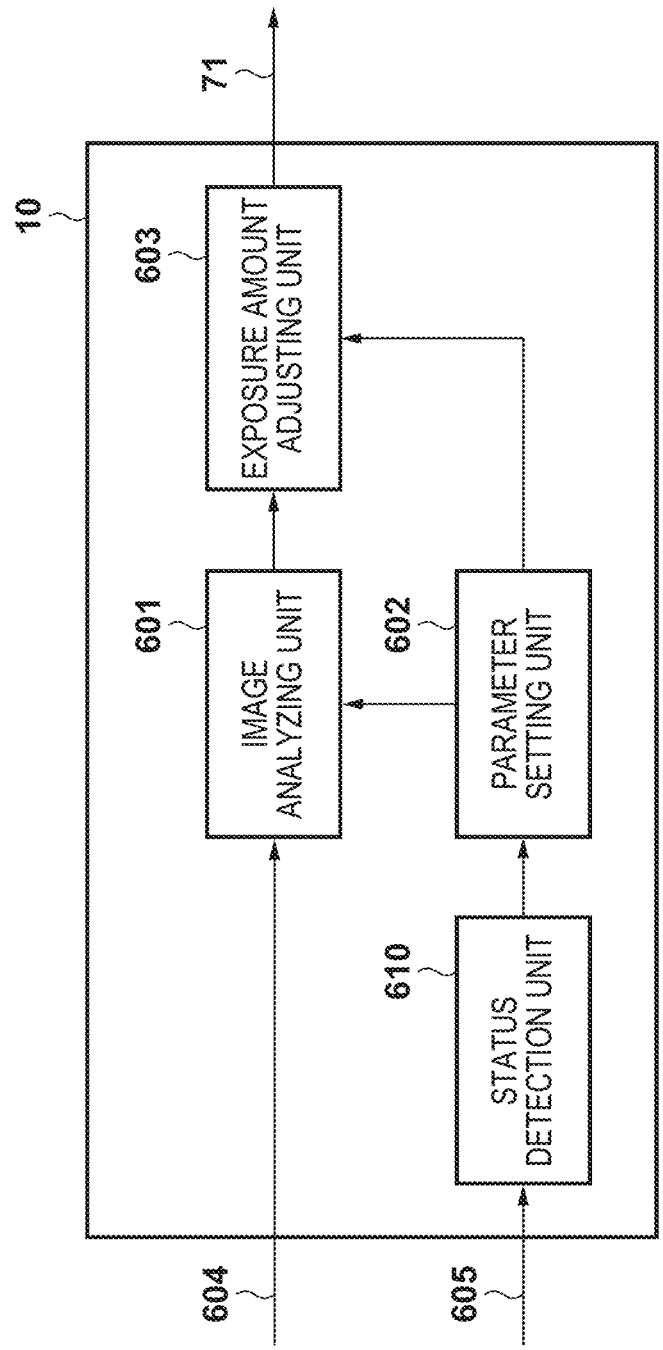
FIG. 21 is a functional block diagram of a CPU for controlling an exposure amount according to an embodiment.

FIG. 21 shows a functional block of the CPU 10, which is configured to suppress the edge effect. Note that in the present embodiment, it is the CPU 10 that performs processing for suppressing the edge effect. However, as already described, a configuration in which the CPU 10 performs this processing in cooperation with the ASIC 18, and a configuration in which only the ASIC 18 performs this processing, are also acceptable.

A status detection unit 610 receives the status information detected by the detection unit 12, and outputs it to a parameter setting unit 602. Based on the status information, the parameter setting unit 602 provides information about, or sets, the correction width parameter that corresponds to the received status information from among correction width parameters in the LUTs 112 to an image analyzing unit 601. Also, to an exposure amount adjusting unit 603, the parameter setting unit 602 provides information about, or sets, the exposure amount adjustment parameters that correspond to the received status information from among exposure amount adjustment parameters in the LUTs 112. Image data 604, which is transmitted from the host computer 8, is stored in the memory 11. Based on the correction width parameter, the image analyzing unit 601 specifies, from among the pixels of the image to be formed from the image data 604, pixels in which the edge effect may occur, and informs the exposure amount adjusting unit 603 of the specified pixels. Note that the image mentioned above refers to a region to which toner adheres, and the image analyzing unit 601 specifies, based on the edges of the region to which toner adheres, pixels in which the edge effect may occur within the region. Based on the exposure amount adjustment parameters, the exposure amount adjusting unit 603 corrects the respective pixel values of the pixels specified by the image analyzing unit 601, and drives the exposure unit 7, using the corrected image data. Note that the correction width parameter is information that indicates the range of the pixels in which the edge effect may occur, and the range is represented as the number of pixels from the pixels at an edge. For example, when the correction width parameter is "5", it is determined that the edge effect may occur in 5 rows of pixels from an edge. The exposure amount adjustment parameters indicate the amount of correction made to the exposure amount for pixels to be subjected to correction. For example, although it is assumed that the exposure amount adjustment parameters in the present embodiment indicate the proportion of reduction in the exposure amount, any other value may be used.

FIGS. 22A to 22C show examples of the LUTs 112. Among these examples, FIG. 22B shows the LUT 112 used in the cases where the temperature and the humidity included in the LUT 112 status information are both above their standard ranges. FIG. 22C shows the LUT 112 used in the cases where the temperature and the humidity included in the LUT 112 status information are both below their standard ranges. FIG. 22A shows the LUT 112 used in the other cases. In the present embodiment, it is assumed that there are LUTs 112 that cover cases with any combinations of the temperature and the humidity. However, if there are combinations of the temperature and the humidity that do not require correction, there is no need to provide LUTs 112 that address the cases with such combinations.

Conditions 1 to 4 shown in each of FIG. 22A to 22C indicate 4-grade evaluations on the usage state of the image forming apparatus 101. Note that in these examples, the degree of deterioration of the image forming apparatus 101 increases in order from the condition 1 to the condition 4. For example, a cumulative image formation count is used as the usage status information. The condition 1 is used when a cumulative image formation count is within the range of 0 to 1000, and the condition 2 is used when the cumulative image formation count is within the range of 1001 to 2000. Furthermore, the condition 3 is used when the cumulative image formation count is within the range of 2001 to 3000, and the condition 4 is used when the cumulative image formation count is 3001 or greater. For example, when the temperature and the humidity indicated by the status information provided by the detection unit 12 are both above their standard ranges, and the cumulative image formation count is 2500, the parameter setting unit 602 determines that the condition 3 of the LUT 112 shown in FIG. 22B is to be used. In this case, the parameter setting unit 602 sets 3 (pixels) to the image analyzing unit 601 as the correction width parameter, and sets a 30% reduction to the exposure amount adjusting unit 603 as the exposure amount adjustment parameter. Note that the sign "-" of the condition 4 shown in FIG. 22B indicates that no exposure amount correction is to be made.

Figures 23A, 23B, 23C:
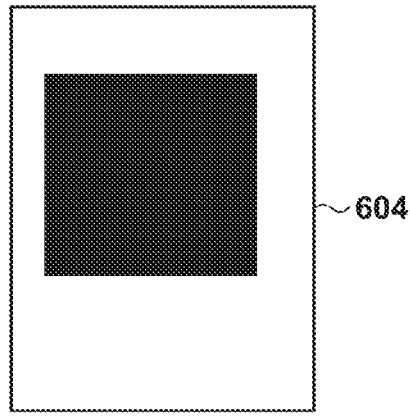
FIGS. 23A to 23C are diagrams respectively showing an image, the pixel values of the image, and pixels to be subjected to correction in the image according to an embodiment.

FIG. 23A shows an image formed from the image data 604, and FIG. 23B shows the image data 604 from which the image shown in FIG. 23A is formed. For example, when the correction width parameter is "2", the image analyzing unit 601 determines pixels whose distance from an edge of the image is within 2 pixels to be pixels to be subjected to correction. In FIG. 23C, regarding the image data shown in FIG. 22B, pixels to be subjected to correction when the correction width parameter is "2" are indicated with "1", and pixels not to be subjected to correction are indicated with "0".

The exposure amount adjusting unit 603 corrects the pixel values of the pixels to be subjected to correction by using the exposure amount adjustment parameter, thereby adjusting the exposure amount. FIG. 24A shows an example of the state of exposure in which the exposure amount is 75% for all of the 4 successive pixels to be subjected to correction. In FIG. 24A, only the pattern shown in FIG. 20A is used. When exposure is performed in the manner shown in FIG. 24A, a repetition pattern is formed in which a subpixel that is not subjected to exposure occurs every three pixels or five pixels. If periodicity occurs in the exposure pattern shown in FIG. 24A, more specifically in the exposure pattern for a plurality of pixels to be subjected to correction, the possibility of the occurrence of undesired radiation noise increases. In other words, if there are successive pixels with the same exposure amount resulting from exposure amount correction, undesired radiation noise may occur. Therefore, in the present embodiment, the periodicity of the exposure pattern is avoided as shown in FIG. 24B. In FIG. 24B, the exposure patterns shown in FIG. 20A, FIG. 20B, FIG. 20C, and FIG. 20D are used. Note that if the number of successive pixels that are to be subjected to correction with the same exposure amount is smaller than a certain number, the influence of undesired radiation noise is limited. Accordingly, a configuration may be adopted in which the exposure pattern for at least one pixel is changed when the number of successive pixels that are to be subjected to correction with the same exposure amount is greater than or equal to a predetermined number. Although the description of FIG. 24A and FIG. 24B is mainly about the main-scanning direction, a similar description is applicable to the sub-scanning direction as well.

Figure 25:
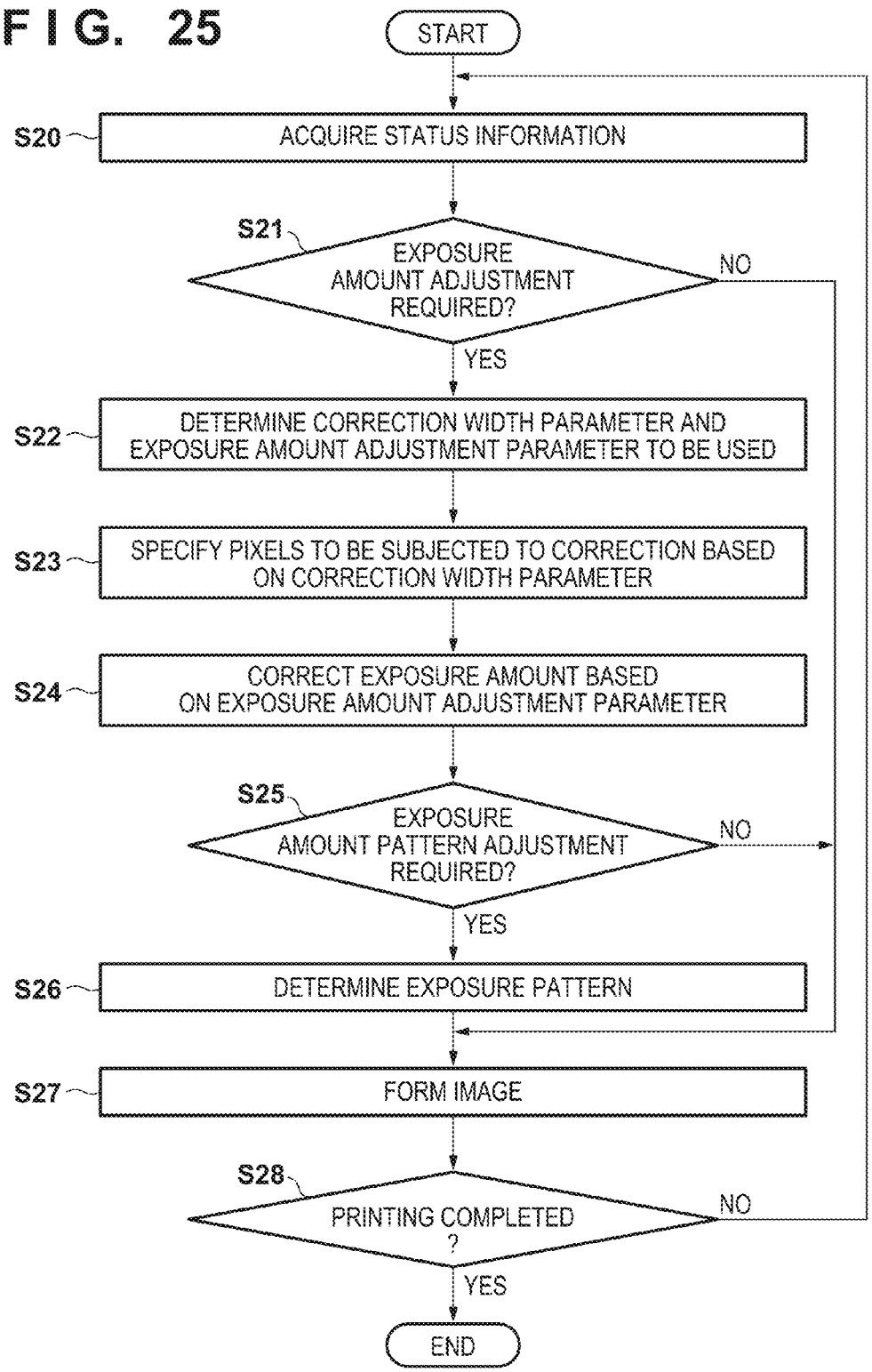
FIG. 25 is a flowchart of correction processing according to an embodiment.

FIG. 25 is a flowchart of exposure amount adjustment processing according to the present embodiment. In step S20, the CPU 10 receives the status information detected by the detection unit 12. In step S21, based on the status information, the CPU 10 determines whether or not it is necessary to adjust the exposure amount. If it is unnecessary to adjust the exposure amount, the CPU 10 forms an image in step S27 based on the image data. On the other hand, when it is necessary to adjust the exposure amount, the CPU 10 determines, in step S22, the correction width parameter and the exposure amount adjustment parameters to be used, from among those shown in the LUTs 112. After that, in step S23, the CPU 10 specifies the pixels to be subjected to correction based on the correction width parameter, and, in step S24, adjusts the exposure amount for the pixels to be subjected to correction based on the exposure amount adjustment parameter. After that, in step S25, the CPU 10 determines whether or not the exposure pattern requires an adjustment. This determination is made based on whether or not periodicity occurs in the exposure pattern for the pixels to be subjected to correction, which are subjected to exposure according to the PWM signal. It is also possible to make the determination based on whether or not the pixels to be subjected to correction include successive pixels with the same exposure amount after correction. If there is no need for adjustment, the CPU 10 forms an image in step S27. On the other hand, if the exposure pattern needs adjustment, the exposure pattern for the pixels to be subjected to correction is determined in step S26, and an image is formed in step S27. For example, when the pixels to be subjected to correction include successive pixels with the same exposure amount after correction, the CPU 10 determines the exposure pattern by varying the exposure pattern for at least one pixel to be subjected to correction from the exposure patterns for the other pixels to be subjected to correction. Also, regardless of the exposure amount for the pixels to be subjected to correction, the CPU 10 can determine the exposure pattern such that no periodicity occurs in the exposure pattern with the corrected exposure amounts for the pixels to be subjected to correction. Note that the exposure correction amount of the exposure pattern determined such that no periodicity occurs is the same as the exposure correction amount of the exposure pattern in which periodicity occurs. In other words, the amount of toner reduction remains the same even if the exposure pattern is changed. After forming an image in step S27, the CPU 10 determines in step S28 whether or not printing has completed, and if printing has not been completed, repeats processing from step S20.

Figures 26, 27:
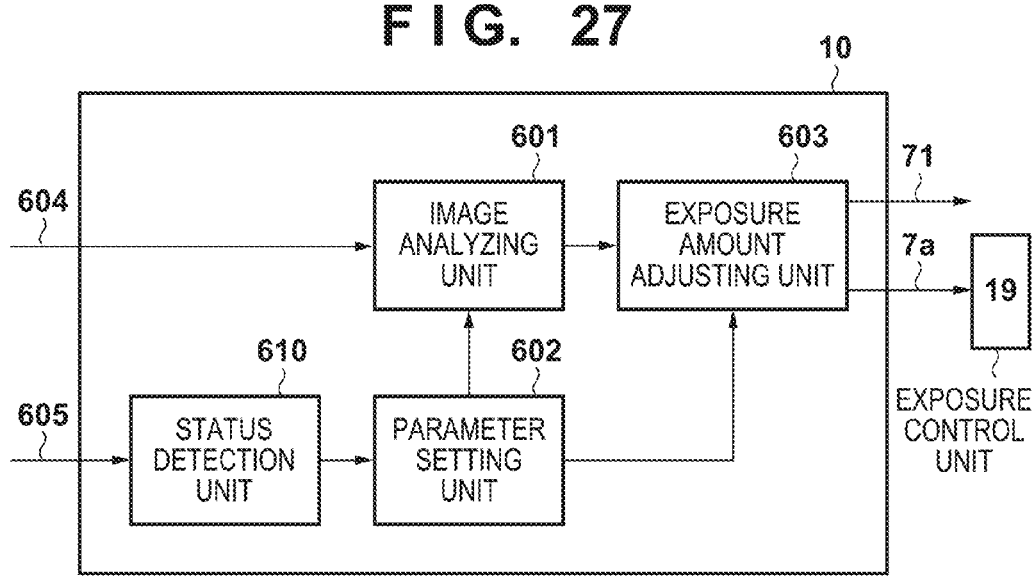
FIG. 26 is a diagram showing pixels to be subjected to correction in an image according to an embodiment.
FIG. 27 is a functional block diagram of a CPU for controlling an exposure amount according to an embodiment.

Unlike the edge effect, sweeping occurs only on the trailing edge side of the image in the rotational direction of the photosensitive member 1. Accordingly, when correcting sweeping, the pixels to be subjected to correction are determined based on the distance from the trailing edge in the rotational direction. FIG. 26 shows the pixels to be subjected to correction in the case of correcting sweeping with respect to the image data shown in FIG. 23B. Note that the correction width parameter is set to 2 pixels.

According to the present embodiment, in the case of adjusting or reducing the exposure amounts for, from among a plurality of pixels constituting image data, pixels in which the edge effect or sweeping may occur, the exposure amounts are corrected such that no periodicity occurs in the exposure pattern. As a result, the edge effect or sweeping of the developer is reduced while noise is suppressed. Therefore, excessive consumption of toner is suppressed.

Note that the effect of suppressing undesired radiation noise increases as the period for which control for avoiding the occurrence of periodicity, i.e., the period during which determination as to periodicity is made, is increased. However, for this purpose, it is necessary to increase the number of exposure pattern types for each exposure amount of one pixel, and increase the period for which the used exposure patterns for the pixels are stored. This leads to an increase in the amount of required memory. Therefore, considering the amount of reduction of undesired radiation noise to be suppressed, a configuration may be adopted in which periodicity is controlled during a period corresponding to several pixels or several seconds.

For example, a configuration may be adopted in which two exposure patterns are alternately used. Also, within a certain period, the influence of undesired radiation noise is limited, and accordingly a configuration may be adopted in which the same exposure pattern is used within this period. For example, this period is set to 100 ms. If this is the case, the exposure amount adjusting unit 603 uses the same exposure pattern during the period of 100 ms even if there are successive pixels with the same exposure amount. A configuration may be adopted in which, upon the period of 100 ms elapsing, an exposure pattern that is different from the previous exposure pattern is used during the subsequent period of 100 ms even if there are successive pixels with the exposure amount that is the same as the previous exposure amount. Also, a configuration may be adopted in which a counter is provided for counting the number of times for which the exposure pattern that is the same as the exposure pattern is used for an adjacent pixel, and the exposure pattern is changed when there are pixels with the same exposure amount even after the count value of the counter reaches a threshold value. For example, by setting the threshold value to a small value such as 2, and setting the period during which counting is performed to a long period such as 1 second, the effect of suppressing undesired radiation noise can be increased. Furthermore, the period during which the determination as to periodicity is made is not necessarily shorter than the period of the image data corresponding to each sheet of recording material. In other words, a configuration may be adopted in which the determination as to whether or not periodicity has occurred is made to address pieces of image data that correspond to a plurality of sheets of the recording material. For example, in the case of an image forming apparatus that can print 60 sheets or more per 1 minute, if the period for which counting is performed is set to be 1 second or longer in a configuration using a counter, the determination as to periodicity is made within a period that covers two successive sheets of the recording material.

Fourth Embodiment

The following describes a fourth embodiment, focusing mainly on differences from the third embodiment. In the third embodiment, the exposure intensity is set to a predetermined intensity, and the exposure amount for one pixel is adjusted by changing the proportion of the subpixels that are to be subjected to exposure. In the present embodiment, the exposure intensity is also changed. FIG. 27 is a functional block of the CPU 10 according to the present embodiment. In the present embodiment, the exposure amount adjusting unit 603 informs the exposure control unit 19 of the exposure intensity by using a signal 7a. The exposure control unit 19 sets the voltage Va to be output to the exposure unit 7 such that the voltage Va equals the exposure intensity informed with the signal 7a.

Figure 28A:
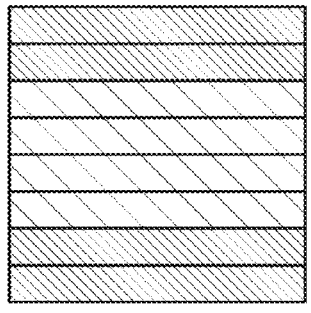
FIGS. 28A to 28F are diagrams illustrating a pixel exposure method according to an embodiment.
Figure 28B:
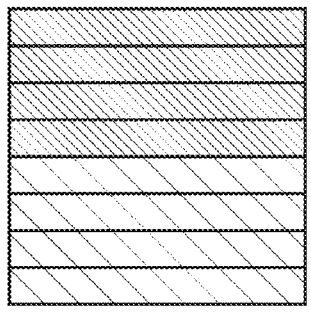
Figure 28C:
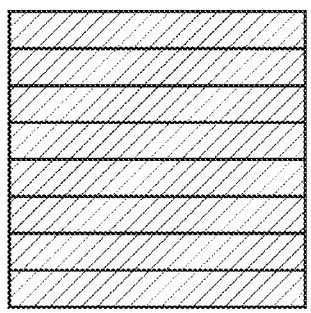
Figure 28D:
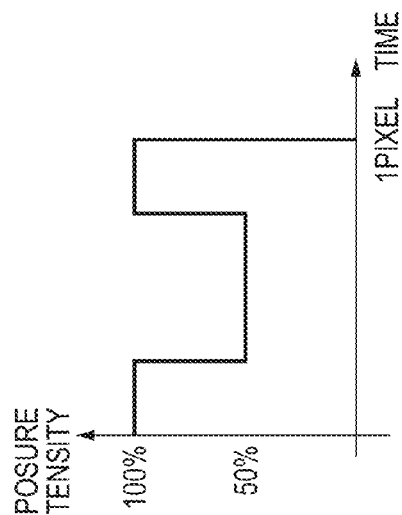
Figure 28E:
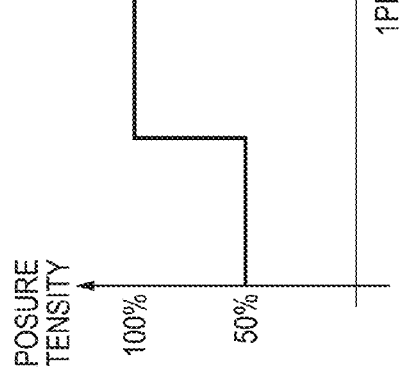
Figure 28F:
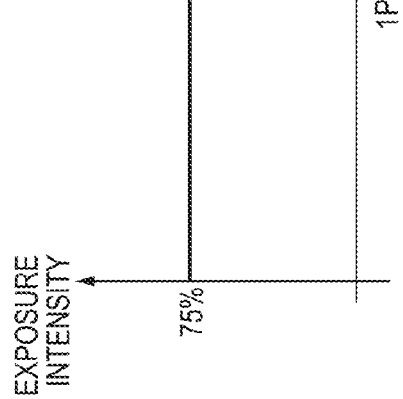

FIGS. 28A to 28C each show a pixel subjected to exposure with a 75% exposure amount. Note that a 100% exposure amount corresponds to the case in which the predetermined exposure intensity is considered as 100% exposure intensity and the entire region of the pixel is subjected to exposure with 100% intensity. FIGS. 28D to 28F show exposure methods applied to the pixels shown in FIGS. 28A to 28C, respectively. As shown in FIG. 28D, the pixel shown in FIG. 28A is a pixel in which all of its subpixels were subjected to exposure with 75% exposure intensity. As shown in FIG. 28E, the pixel shown in FIG. 28B is a pixel in which a half of its subpixels were subjected to exposure with 50% exposure intensity, and the other half of its subpixels were subjected to exposure with 100% exposure intensity. As shown in FIG. 28F, the pixel shown in FIG. 28C is, as with the pixel shown in FIG. 28B, a pixel in which a half of its subpixels were subjected to exposure with 50% exposure intensity, and the other half of its subpixels were subjected to exposure with 100% exposure intensity. However, in FIG. 28B and FIG. 28C, the exposure pattern for the pixel is different, in other words, the subpixels subjected to exposure are different. In this way, as in the third embodiment, there are a plurality of exposure patterns corresponding to the same exposure amount for a pixel even in the case of varying the exposure intensity, and it is possible to suppress the degradation in image quality such that no periodicity occurs in the exposure patterns.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-223193, filed on Oct. 31, 2014, Japanese Patent Application No. 2014-223194, filed on Oct. 31, 2014 and Japanese Patent Application No. 2015-175890, filed on Sep. 7, 2015, which are hereby incorporated by reference herein in their entirety.

What is claimed is:

1. An image forming apparatus that forms an image based on image data, comprising:
a photosensitive member;
an exposure unit configured to form an electrostatic latent image by exposing the photosensitive member;
a developing unit configured to form the image by developing the electrostatic latent image on the photosensitive member with developer;
a specifying unit configured to specify, based on the image data, a pixel to be subjected to correction from among pixels of the image to be formed from the image data; and
a correction unit configured to correct an exposure amount of the exposure unit for the pixel to be subjected to correction from an exposure amount indicated by the image data,
wherein the correction unit is further configured to correct the exposure amount applied by the exposure unit to the pixel to be subjected to correction by not exposing at least a portion of a region of the pixel to be subjected to correction according to the distance between the pixel to be subjected to correction and an edge of the image to be formed from the image data.

2. The image forming apparatus according to claim 1, wherein the specifying unit is further configured to specify the pixel to be subjected to correction based on first information that indicates the pixel to be subjected to correction with the distance from an edge of the image to be formed from the image data.

3. The image forming apparatus according to claim 2, wherein the distance to the pixel to be subjected to correction from the edge of the image to be formed from the image data, the distance being indicated by the first information, is inclusive of a pixel at the edge, or the distance to the pixel to be subjected to correction from the edge of the image to be formed from the image data, the distance being indicated by the first information, is not inclusive of the pixel at the edge.

4. The image forming apparatus according to claim 1, wherein the correction unit is further configured to correct the exposure amount for the pixel to be subjected to correction based on second information that indicates a correction amount corresponding to the distance from the edge.

5. The image forming apparatus according to claim 1, wherein the correction unit is further configured to divide the pixel to be subjected to correction into N subpixels, and not to expose at least one subpixel from among the N subpixels.

6. The image forming apparatus according to claim 1, wherein the specifying unit is further configured to specify the pixel to be subjected to correction based on distances from a plurality of edges of the image to be formed from the image data.

7. The image forming apparatus according to claim 6, wherein the correction unit is further configured to correct the exposure amount for the pixel to be subjected to correction based on a shortest distance from among the distances from the plurality of edges of the image to be formed from the image data.

8. The image forming apparatus according to claim 1, wherein the specifying unit is further configured to specify the pixel to be subjected to correction based on the distance from a trailing edge of the image to be formed from the image data in a rotational direction of the photosensitive member.

9. The image forming apparatus according to claim 1, wherein when a width of the image to be formed from the image data is smaller than a predetermined value, the specifying unit is further configured not to perform specification of a pixel to be subjected to correction with respect to a direction of the width.

10. The image forming apparatus according to claim 1, wherein when a width of the image to be formed from the image data is smaller than a predetermined value, the correction unit is further configured not to correct exposure amounts for pixels included within the width.

11. The image forming apparatus according to claim 1, wherein the edge is a boundary between a pixel on which the image is to be formed and a pixel on which no image is to be formed.

12. The image forming apparatus according to claim 1, wherein the correction unit is further configured to, when exposure amounts for a plurality of pixels to be subjected to correction remain the same after correction, vary an exposure pattern for at least one of the plurality of pixels to be subjected to correction from exposure patterns for the rest of the plurality of pixels to be subjected to correction.

13. The image forming apparatus according to claim 12, wherein an exposure pattern for a pixel is an exposure intensity pattern applied in exposure of subpixels that constitute one pixel.

14. The image forming apparatus according to claim 12, wherein the specifying unit is further configured to specify the pixel to be subjected to correction based on first information that indicates the pixel to be subjected to correction with the distance from an edge of the image to be formed from the image data.

15. The image forming apparatus according to claim 14, further comprising:
a holding unit configured to hold the first information provided in a plurality of pieces; and
a detection unit configured to detect status information that indicates a status of the image forming apparatus,
wherein the specifying unit is further configured to determine, from among the plurality of pieces of first information, a piece of first information to be used for specifying the pixel to be subjected to correction based on the status information detected by the detection unit.

16. The image forming apparatus according to claim 12, wherein the plurality of pixels to be subjected to correction are successive pixels.

17. An image processing apparatus that supplies image data used for forming an image to an image forming apparatus that includes a photosensitive member, an exposure unit that forms an electrostatic latent image by exposing the photosensitive member, and a developing unit that forms the image by developing the electrostatic latent image on the photosensitive member by using developer, the image processing apparatus comprising:
a specifying unit configured to specify, based on the image data, a pixel to be subjected to correction from among pixels of the image to be formed from the image data;
a correction unit configured to generate corrected image data by correcting a pixel value of the pixel to be subjected to correction from a pixel value indicated by the image data; and
an output unit configured to output the corrected image data to the image forming apparatus,
wherein the correction unit is configured to correct the pixel value of the pixel to be subjected to correction according to the distance between the pixel to be subjected to correction and an edge of the image to be formed from the image data, and
at least a portion of a region of the pixel to be subjected to correction is not subjected to exposure when the exposure unit exposes the pixel to be subjected to correction.

18. An image forming apparatus that forms an image based on image data, comprising:
a photosensitive member;
an exposure unit configured to form an electrostatic latent image by exposing the photosensitive member;
a developing unit configured to form the image by developing the electrostatic latent image on the photosensitive member by using developer;
a specifying unit configured to specify, based on the image data, a pixel to be subjected to correction from among pixels of the image to be formed from the image data; and a correction unit configured to correct an exposure amount of the exposure unit for the pixel to be subjected to correction from an exposure amount indicated by the image data,
wherein the correction unit is further configured to, when exposure amounts for a plurality of pixels to be subjected to correction remain the same after correction, vary an exposure pattern for at least one of the plurality of pixels to be subjected to correction from exposure patterns for the rest of the plurality of pixels to be subjected to correction.

19. The image forming apparatus according to claim 18, wherein an exposure pattern for a pixel is an exposure intensity pattern applied in exposure of subpixels that constitute one pixel.

20. The image forming apparatus according to claim 18, wherein the correction unit is further configured to, when a number of pixels for which the exposure amounts remains the same after correction, from among a plurality of pixels to be subjected to correction, is greater than or equal to a predetermined number, vary an exposure pattern for at least one of the plurality of pixels to be subjected to correction from exposure patterns for the rest of the plurality of pixels to be subjected to correction.

21. The image forming apparatus according to claim 18, wherein the specifying unit is further configured to specify the pixel to be subjected to correction based on first information that indicates the pixel to be subjected to correction with the distance from an edge of the image to be formed from the image data.

22. The image forming apparatus according to claim 21, further comprising:
a holding unit configured to hold the first information provided in a plurality of pieces; and
a detection unit configured to detect status information that indicates a status of the image forming apparatus,
wherein the specifying unit is further configured to determine, from among the plurality of pieces of first information, a piece of first information to be used for specifying the pixel to be subjected to correction based on the status information detected by the detection unit.

23. The image forming apparatus according to claim 22, wherein the status information includes ambient information, or includes usage status information that indicates the degree of deterioration of the image forming apparatus due to usage.

24. The image forming apparatus according to claim 18, wherein the correction unit is further configured to correct the exposure amount for the pixel to be subjected to correction based on second information that indicates a correction amount for the pixel to be subjected to correction.

25. The image forming apparatus according to claim 18, wherein the plurality of pixels to be subjected to correction are successive pixels.

26. An image forming apparatus that forms an image based on image data, comprising:
a photosensitive member;
an exposure unit configured to form an electrostatic latent image by exposing the photosensitive member;
a developing unit configured to form the image by developing the electrostatic latent image on the photosensitive member by using developer;

a specifying unit configured to specify, based on the image data, pixels to be subjected to correction from among pixels of the image to be formed from the image data; and a correction unit configured to correct exposure amounts of the exposure unit for the pixels to be subjected to correction from exposure amounts indicated by the image data, wherein the correction unit is further configured to determine an exposure pattern for each of the pixels to be subjected to correction such that no periodicity occurs in an exposure pattern of corrected exposure amounts for the pixels to be subjected to correction.

27. The image forming apparatus according to claim 26, wherein the exposure pattern is an exposure intensity pattern.

28. The image forming apparatus according to claim 26, wherein a period during which the correction unit determines whether or not periodicity occurs in an exposure pattern is shorter than a period of image data corresponding to one recording material, or the period during which the correction unit determines whether or not periodicity occurs in an exposure pattern is longer than the period of image data corresponding to one recording material.

29. The image forming apparatus according to claim 26, wherein the correction unit is further configured to, in a case where periodicity occurs in the exposure pattern of the corrected exposure amounts for the pixels to be subjected to correction, determine an exposure pattern for each of the pixels to be subjected to correction such that no periodicity occurs, and wherein exposure correction amounts determined for the pixels to be subjected to correction such that no periodicity occurs are the same as exposure correction amounts for the pixels to be subjected to correction in the case where periodicity occurs.

30. An image processing apparatus that supplies image data used for forming an image to an image forming apparatus that includes a photosensitive member, an exposure unit that forms an electrostatic latent image by exposing the photosensitive member, and a developing unit that forms the image by developing the electrostatic latent image on the photosensitive member by using developer, the image processing apparatus comprising:

a specifying unit configured to specify, based on the image data, a pixel to be subjected to correction from among pixels of the image to be formed from the image data;

a correction unit configured to generate corrected image data by correcting a pixel value of the pixel to be subjected to correction from a pixel value indicated by the image data; and an output unit configured to output the corrected image data to the image forming apparatus, wherein when exposure amounts applied by the exposure unit to a plurality of pixels to be subjected to correction remain the same after correction, the correction unit varies an exposure pattern for at least one of the plurality of pixels to be subjected to correction from exposure patterns for the rest of the plurality of pixels to be subjected to correction.

31. An image processing apparatus that supplies image data used for forming an image to an image forming apparatus that includes a photosensitive member, an exposure unit that forms an electrostatic latent image by exposing the photosensitive member, and a developing unit that forms the image by developing the electrostatic latent image on the photosensitive member by using developer, the image processing apparatus comprising:

a specifying unit configured to specify, based on the image data, pixels to be subjected to correction from among pixels of the image to be formed from the image data;

a correction unit configured to generate corrected image data by correcting pixel values of the pixels to be subjected to correction from pixel values indicated by the image data; and an output unit configured to output the corrected image data to the image forming apparatus, wherein the correction unit is further configured to determine an exposure pattern for each of the pixels to be subjected to correction such that no periodicity occurs in the exposure pattern of exposure amounts applied by the exposure unit according to the corrected pixel values of the pixels to be subjected to correction.

\* \* \* \* \*